(12) United States Patent
Park et al.

(10) Patent No.: US 11,216,040 B2
(45) Date of Patent: Jan. 4, 2022

(54) FLEXIBLE ELECTRONIC DEVICE AND METHOD FOR OPERATING SAME

(71) Applicant: Samsung Electronics Co., Ltd., Gyeonggi-do (KR)

(72) Inventors: Namjoon Park, Gyeonggi-do (KR); Jinik Kim, Gyeonggi-do (KR); Jeongmin Park, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/886,913

(22) Filed: May 29, 2020

(65) Prior Publication Data

US 2020/0379516 A1 Dec. 3, 2020

(30) Foreign Application Priority Data

Jun. 3, 2019 (KR) .......................... 10-2019-0065301

(51) Int. Cl.
*G06F 1/16* (2006.01)
(52) U.S. Cl.
CPC .......... *G06F 1/1652* (2013.01); *G06F 1/1616* (2013.01); *G06F 1/1684* (2013.01)
(58) Field of Classification Search
CPC combination set(s) only.
See application file for complete search history.

(56) References Cited

U.S. PATENT DOCUMENTS 9,720,450 B2 * 8/2017 Choi ..................... G06F 1/1626
9,971,712 B2 * 5/2018 Oh ...................... G06F 3/04883
10,042,391 B2 * 8/2018 Yun ..................... G06F 3/04883
10,073,668 B2 * 9/2018 Chun ..................... G06F 3/0481
10,235,119 B2 * 3/2019 Choi ..................... G06F 1/1677

(Continued)

FOREIGN PATENT DOCUMENTS

CN 109806589 A 5/2019
EP 2996013 A1 3/2016

(Continued)

OTHER PUBLICATIONS

International Search Report dated Sep. 17, 2020.
European Search Report dated Oct. 27, 2020.

*Primary Examiner* — Lisa Lea-Edmonds
(74) *Attorney, Agent, or Firm* — Cha & Reiter, LLC

(57) ABSTRACT

The present application relates to a flexible electronic device for sensing a deformation state and a method for operating the same. An electronic device comprises a housing; a flexible display; at least one first sensor disposed in the housing; at least one second sensor disposed in the housing and different from the at least one first sensor; at least one processor disposed in the housing and operatively connected to the flexible display, the at least one first sensor, and the at least one second sensor; and memory operatively connected to the at least one processor, wherein the memory stores instructions that, when executed, cause the at least one processor to perform a plurality of operations comprising: acquiring first data from the at least one first sensor; activating the at least one second sensor at least partially based on the acquired first data; acquiring second data from the at least one second sensor; and sensing a deformation state of the flexible display at least partially based on the acquired first or second data.

20 Claims, 24 Drawing Sheets

(56) References Cited

U.S. PATENT DOCUMENTS

| | | | |
|---|---|---|---|
| 10,263,982 B2 * | 4/2019 | Kim | G06F 1/1684 |
| 10,394,371 B2 * | 8/2019 | Kim | G06F 1/1643 |
| 10,645,205 B2 * | 5/2020 | Lee | H04M 1/0268 |
| 10,673,848 B2 * | 6/2020 | Kim | G06F 1/1616 |
| 10,812,637 B2 * | 10/2020 | Jung | H04M 1/72415 |
| 2010/0064536 A1 | 3/2010 | Caskey et al. | |
| 2013/0176248 A1 * | 7/2013 | Shin | G06F 1/1652 |
| | | | 345/173 |
| 2014/0062859 A1 * | 3/2014 | Lee | G09G 3/3275 |
| | | | 345/156 |
| 2014/0210737 A1 | 7/2014 | Hwang et al. | |
| 2015/0331593 A1 | 11/2015 | Lee et al. | |
| 2017/0016720 A1 * | 1/2017 | Choi | G01B 21/22 |
| 2018/0347968 A1 | 12/2018 | Lee et al. | |
| 2020/0249898 A1 * | 8/2020 | Ko | G09G 3/20 |
| 2020/0364021 A1 * | 11/2020 | Park | H04M 1/72516 |
| 2021/0150953 A1 * | 5/2021 | Lee | G09G 5/38 |

FOREIGN PATENT DOCUMENTS

| | | |
|---|---|---|
| EP | 3483715 A1 | 5/2019 |
| KR | 10-2014-0096861 A | 8/2014 |
| KR | 10-2015-0132918 A | 11/2015 |
| KR | 10-2016-0075206 A | 6/2016 |

* cited by examiner

FLEXIBLE ELECTRONIC DEVICE AND METHOD FOR OPERATING SAME

CROSS-REFERENCE TO RELATED APPLICATION(S)

This application is based on and claims priority under 35 U.S.C. 119 to Korean Patent Application No. 10-2019-0065301, filed on Jun. 3, 2019, in the Korean Intellectual Property Office, the disclosure of which is herein incorporated by reference in its entirety.

BACKGROUND

1) Field

Certain embodiments relate to a flexible electronic device for sensing a deformation state and a method for operating the same.

2) Description of Related Art

Electronic devices are nowadays equipped with various functions, including taking still or moving images, playing music files or moving image files, gaming, receiving broadcasts, and supporting wireless Internet, and thus have been implemented as versatile multimedia players. Accordingly, electronic devices undergo new types of development, in terms of hardware or software, in order to enhance portability and convenience while satisfying user demands.

The above information is presented as background information only to assist with an understanding of the disclosure. No determination has been made, and no assertion is made, as to whether any of the above might be applicable as prior art with regard to the disclosure.

SUMMARY

An electronic device according to certain embodiments comprises a housing; a flexible display comprising a first portion and a second portion that are movable relative to each other; at least one first sensor disposed in the housing and configured to measure the relative position of the first portion and the second portion; at least one second sensor different from the at least one first sensor, the at least one second sensor being disposed in the housing and configured to measure the relative position of the first portion and the second portion; at least one processor disposed in the housing and operatively connected to the flexible display, the at least one first sensor, and the at least one second sensor; and memory operatively connected to the at least one processor, wherein the memory stores instructions that, when executed, cause the at least one processor to perform a plurality of operations comprising: acquiring first data from the at least one first sensor; activating the at least one second sensor at least partially based on the acquired first data; acquiring second data from the at least one second sensor; and sensing a deformation state of the flexible display at least partially based on the acquired first or second data.

A method for operating an electronic device, according to certain embodiments, the method comprises acquiring first data from at least one first sensor configured to measure a relative position of a first portion and a second portion of a flexible display; activating at least one second sensor different from the at least one first sensor at least partially based on the acquired first data; acquiring second data from the activated at least one second sensor; and sensing a deformation state of the flexible display at least partially based on the acquired first or second data.

Advantageous effects that can be obtained in the disclosure are not limited to the advantageous effects described above, and other advantageous effects not mentioned herein may be clearly understood by a person skilled in the art to which the disclosure pertains from the following description.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Electronic devices may be structurally flexible. The mechanical state of a flexible-type electronic device may be changed by a user gesture. In addition, the operation of the flexible-type electronic device may be controlled based on a state change.

Such a flexible-type electronic device may switch from an open state (or full open state) to a folded-in state or a closed state. Such a state change may be determined by an inertia sensor, a Hall IC sensor, or the like.

However, such sensors have different characteristics, respectively, making it difficult to identify various states of the electronic device. For example, the open state or closed state of the flexible-type electronic device may be determined by using the Hall IC sensor, but the characteristics of the Hall IC sensor make it difficult to measure deformation equal to or larger than a specific angle. In addition, the folded-in state of the flexible-type electronic device may be determined by using the inertia sensor, but characteristics of the inertia sensor (errors accumulate as the measurement time increases) may degrade the precision of measurement results.

Accordingly, certain embodiments are for providing a method and an apparatus for precisely measuring the deformation state of an electronic device. According to certain embodiments, a measurement sensor is selected based on the degree of deformation in connection with a flexible-type electronic device, and the deformation state is determined based on the selected sensor, thereby enabling precise measurement of the state of the electronic device.

Technical objectives to be accomplished in this document are not limited to the technical objects described above, and other technical objects not mentioned herein may be clearly understood by a person skilled in the art to which the disclosure pertains from the following description.

Hereinafter, certain embodiments will be described in detail with reference to the accompanying drawings. In the following descriptions of embodiments, detailed descriptions of known functions or configurations related thereto, if deemed to be likely to make the gist of the disclosure unnecessarily unclear, will be omitted. Terms used herein are defined based on corresponding functions in the disclosure, and may vary depending on the intents, practices, or the like of the user or the operator. Accordingly, the definition thereof is to be made based on the overall context of the disclosure.

Figure 1:
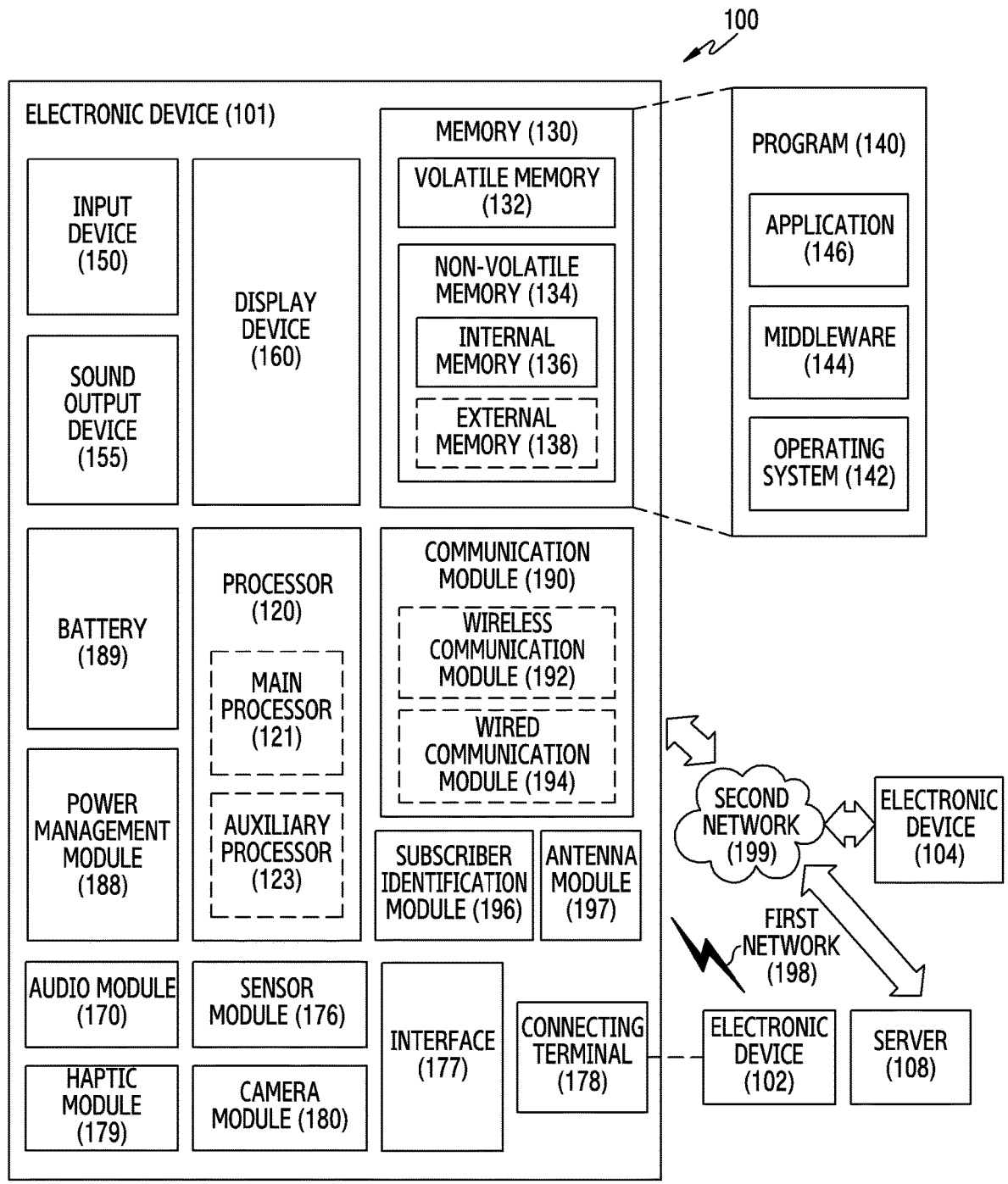
FIG. 1 is a block diagram of an electronic device inside a network environment according to certain embodiments.
Figure 3A:
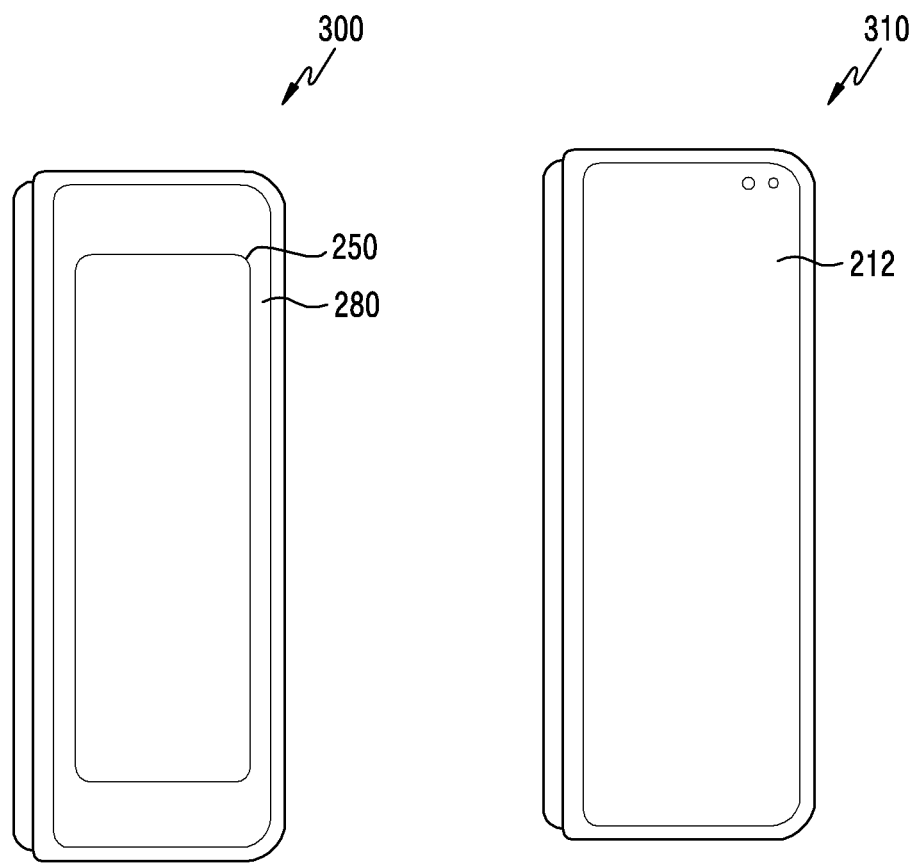
FIG. 3A is a diagram illustrating a closed state of an electronic device according to certain embodiments.
Figure 3B:
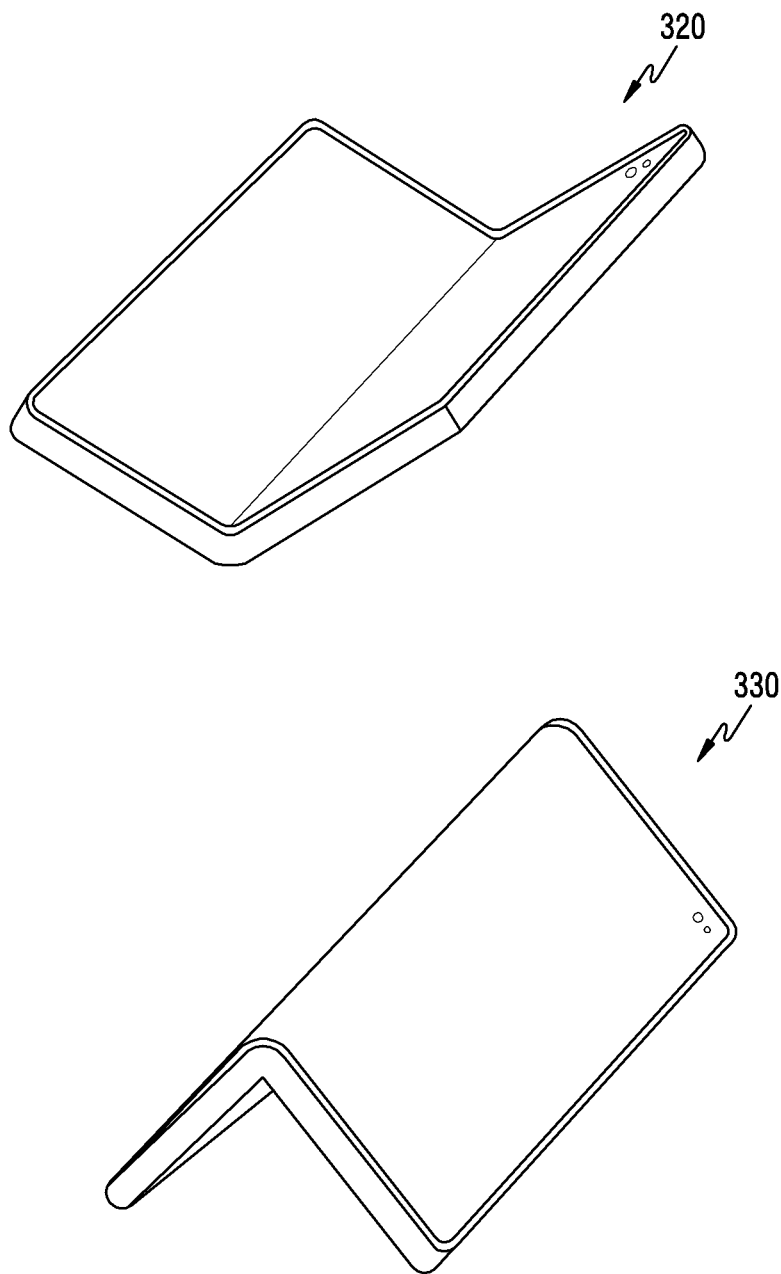
FIG. 3B is a diagram illustrating a folded-in state of an electronic device according to certain embodiments.
Figure 4:
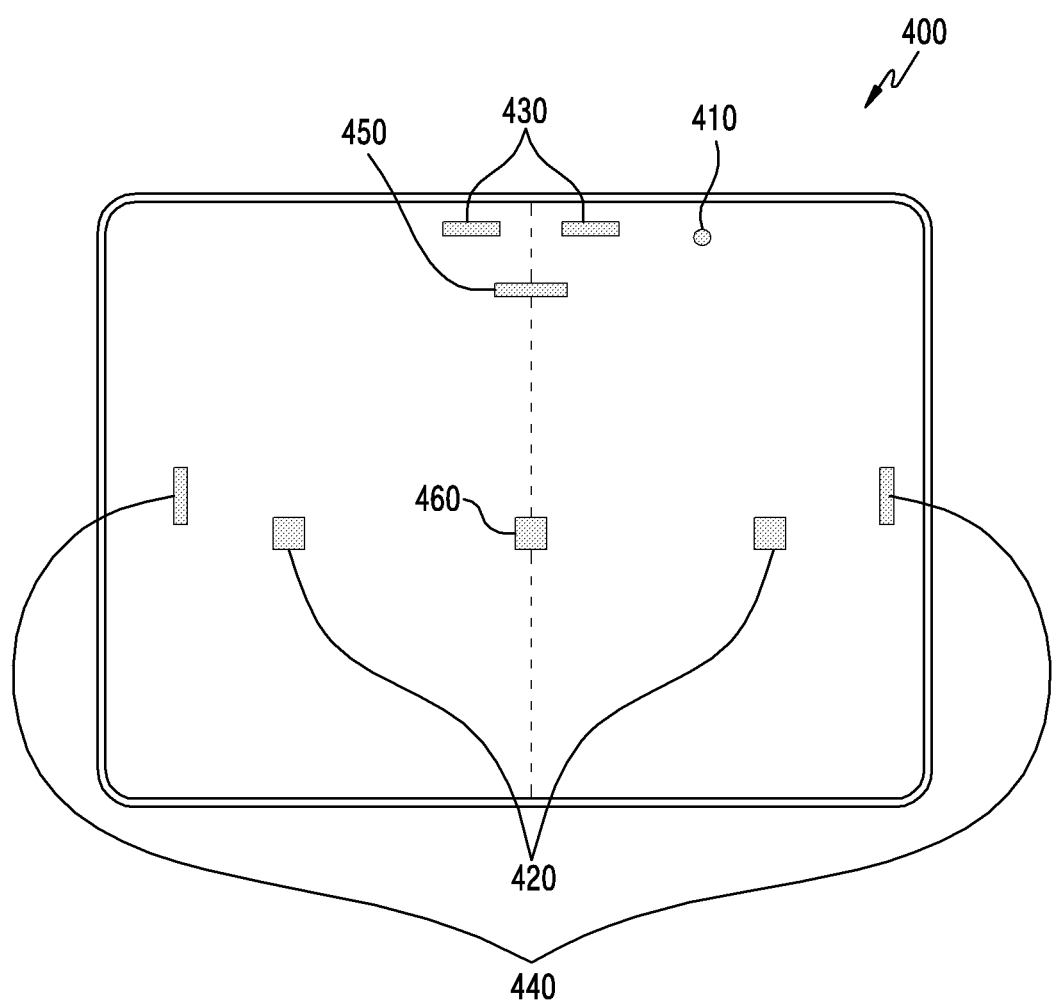
FIG. 4 is a diagram illustrating sensors disposed on the electronic device.
Figure 13:
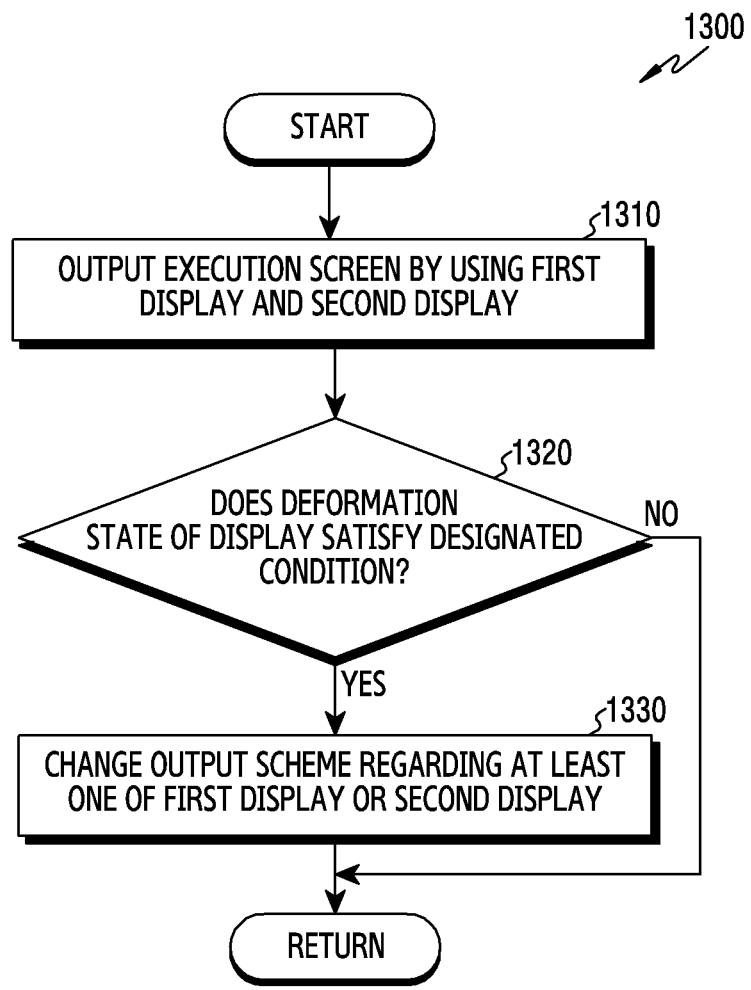
FIG. 13 is a flowchart for changing the display output scheme according to the deformation state of the display in connection with an electronic device according to certain embodiments.
Figure 14:
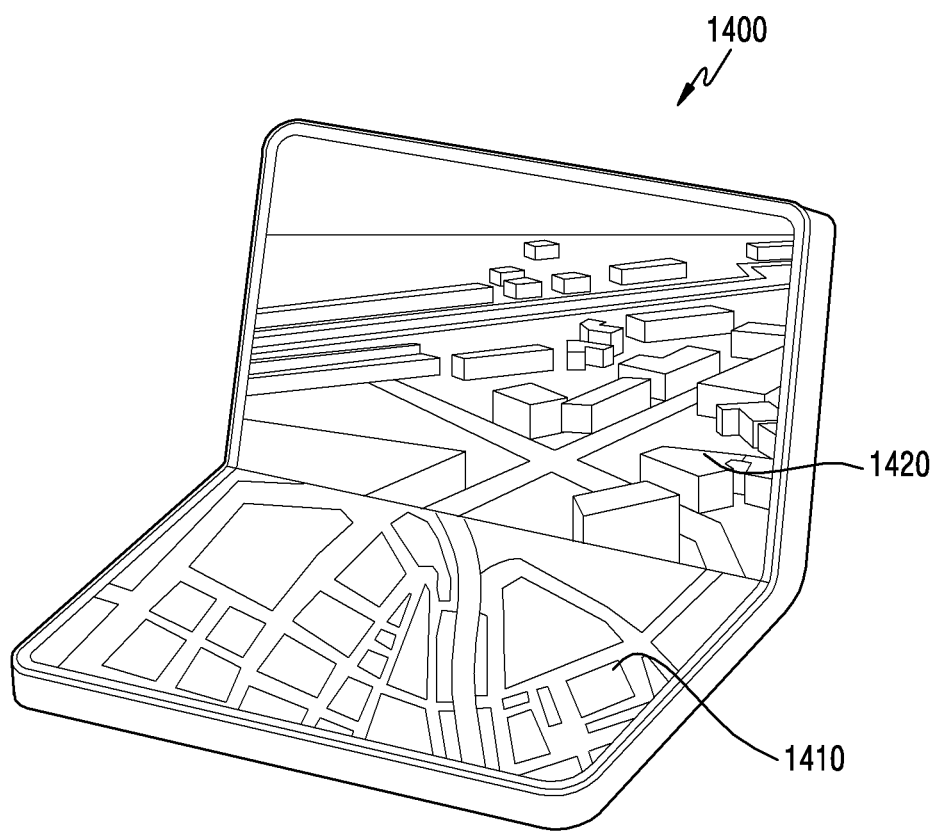
FIG. 14 is a diagram for describing an operation of changing the output scheme based on the deformation state in connection with an electronic device according to certain embodiments.
Figure 15:
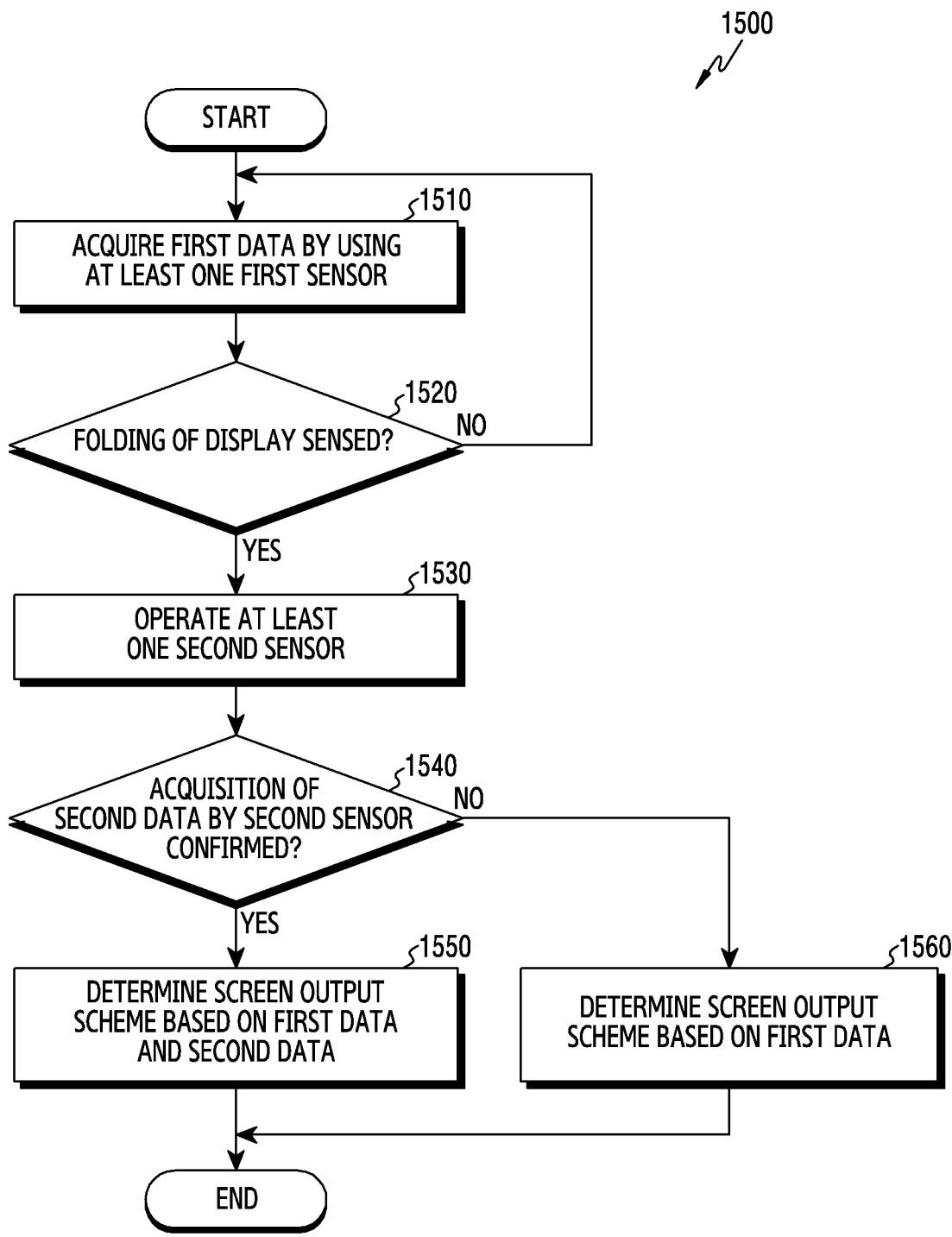
FIG. 15 is a flowchart for determining the operating mode in connection with an electronic device according to certain embodiments.
Figure 16A:
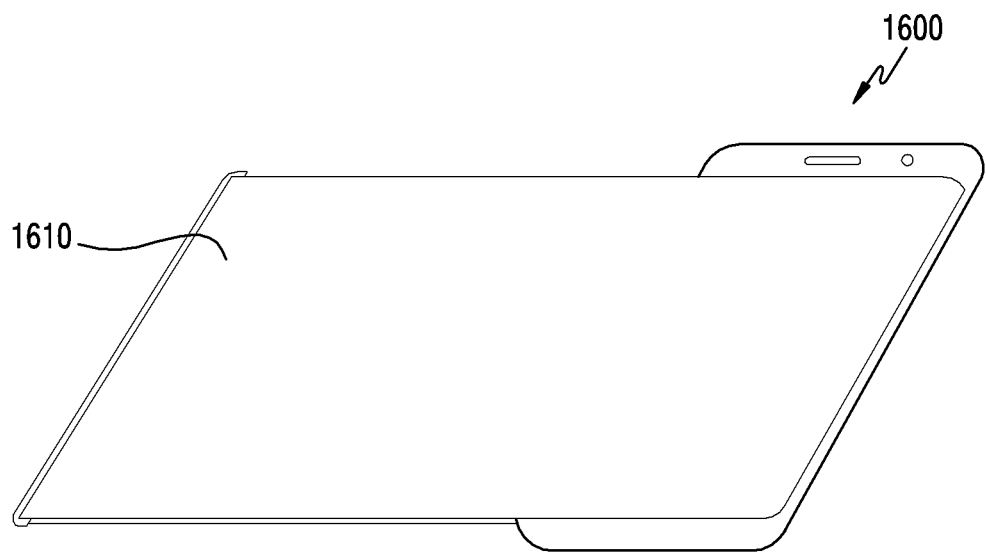
FIG. 16A is a diagram for describing the display structure of an electronic device according to certain embodiments.
Figure 16B:
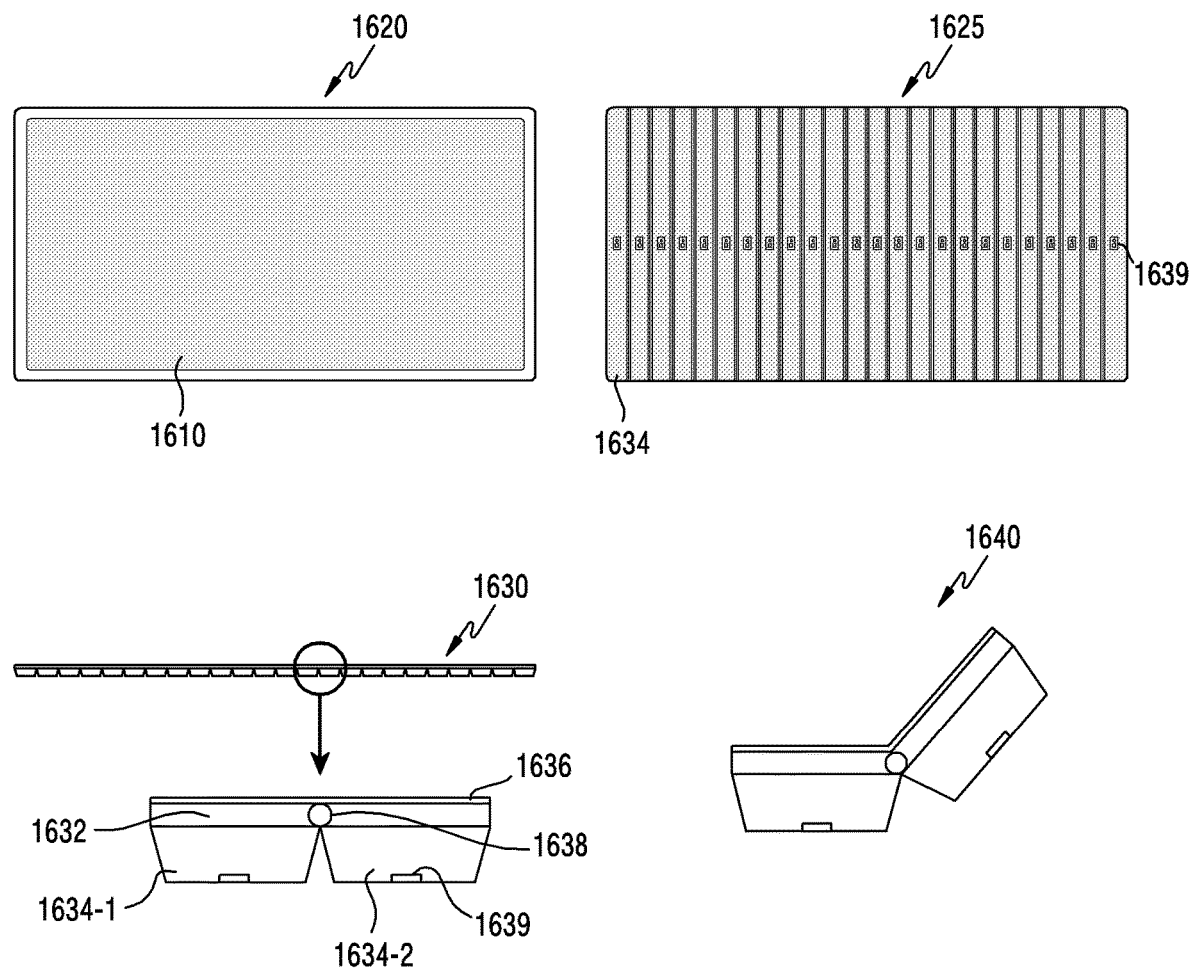
FIG. 16B is a diagram for describing the display structure of an electronic device according to certain embodiments.
Figure 16C:
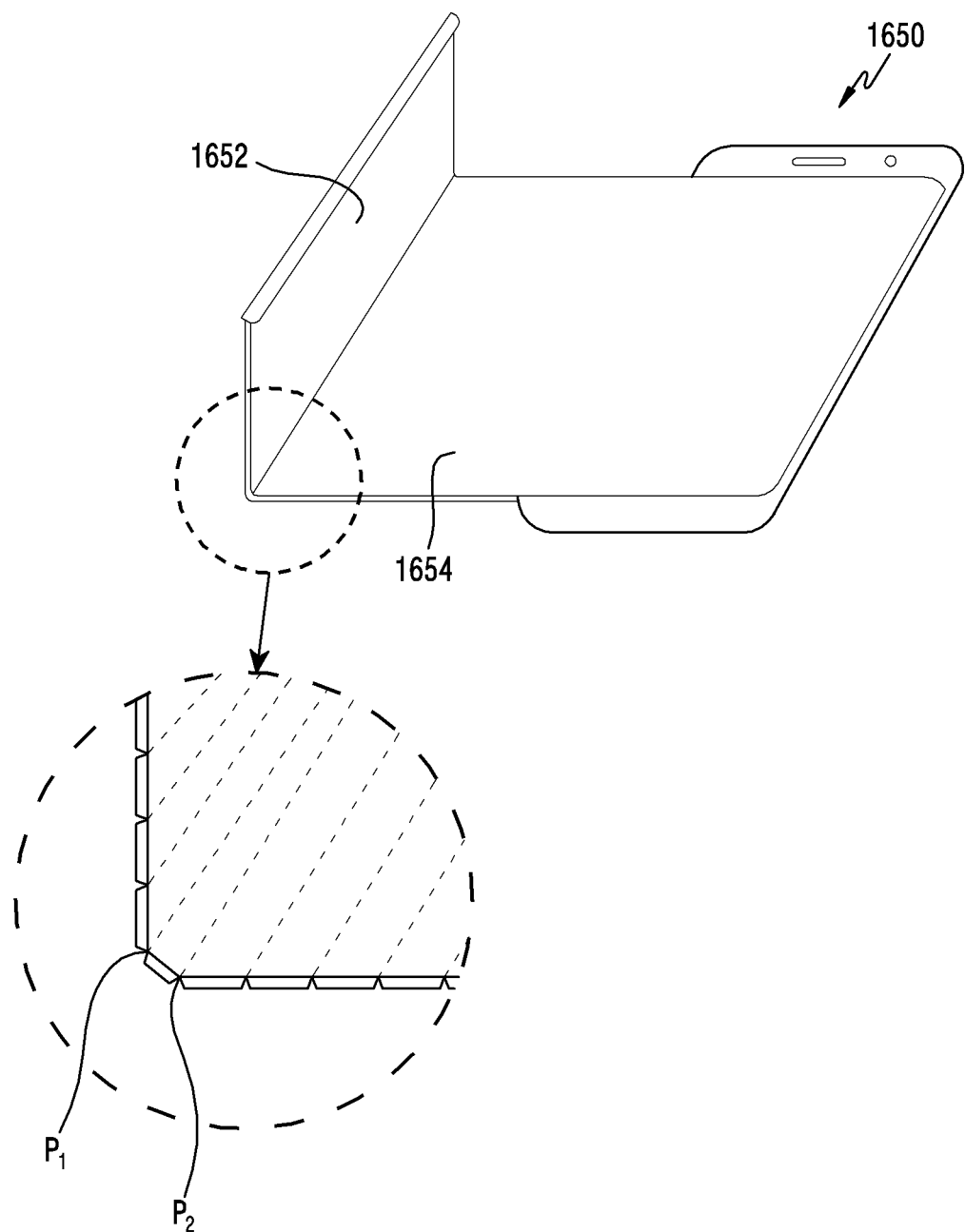
FIG. 16C is another diagram for describing an operation of changing the output scheme based on the deformation state in connection with an electronic device according to certain embodiments.

FIG. 1 will describe an electronic device 101 which can have an open state a closed state, or a folded-in state. FIG. 2 describes the open state, FIG. 3A describes the closed state, and FIG. 3B describes the folded-in state. FIG. 4 describes sensors configured to detect the particular deformation state of the electronic device according to one embodiment. FIGS. 5-8B describe determining the deformation state of the electronic device using the sensors. FIGS. 9-12 describe embodiments where the electronic device has more than one folding portion. FIGS. 13-15 describe changing the output scheme based on the determined deformation state. FIGS. 16A-16C show an embodiment with an expandable display.

Electronic Device

FIG. 1 is a block diagram illustrating an electronic device 101 in a network environment 100 according to certain embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

In certain embodiments, the processor 120, memory 130, input device 150, sound output device 155, display device 160, audio module 170, sensor module 176, interface 177, haptic module 179, camera module 180, power management module 188, battery 189, communication module 190, subscriber identification module (SIM) 196, and antenna module 197 can be disposed in a foldable housing as will be shown.

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

Hereinafter, the term "processor" shall be understood to include both the singular and plural context.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134. The term "memory" shall be understood to refer to an entire memory system and may include memory across multiple integrated circuits.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The display device 160 can have a first region and a second region. The first region and second region can be rotatably movable with respect to each other about a folding axis substantially along a center line of the display device 160, as will be shown in FIG. 2A.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

In certain embodiments, the sensor module 176 can include at least one first sensor and at least one second sensor. The at least one first sensor and at least one second sensor can provide information about the folding or deformation state of the housing of the electronic device. The at least one first sensor can include at least one of a Hall Integrated Circuit (IC) sensor, and an acceleration sensor. The at least one second sensor can include at least one of an angle encoder or rotary sensor. The at least one first sensor can provide first data to the processor 120. The at least one second sensor are configurable to be selectively activated by the processor 120. For example, the processor 120 can activated the at least one second sensor based on first data received from the at least one first sensor.

The interface 177 may support one or more specified protocols to be used for the electronic device 101 to be coupled with the external electronic device (e.g., the electronic device 102) directly (e.g., wired) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

The electronic device 101 can be disposed in a foldable housing including a first housing and a second housing that are connected to each other by a folding portion. The foldable housing can take various deformation states such as an open state, a closed state, and a folded-in state. The open state is when the first housing and second housing generally form a single, flat, or within a certain threshold of flat, surface over the first housing and second housing. The closed state is when the first housing and second housing are either stacked onto each other, or within a certain degree of stacked onto each other. The folded-in state is when the first housing and second housing form an angle that is between the open state and the closed state.

Deformation States

Figure 2A:
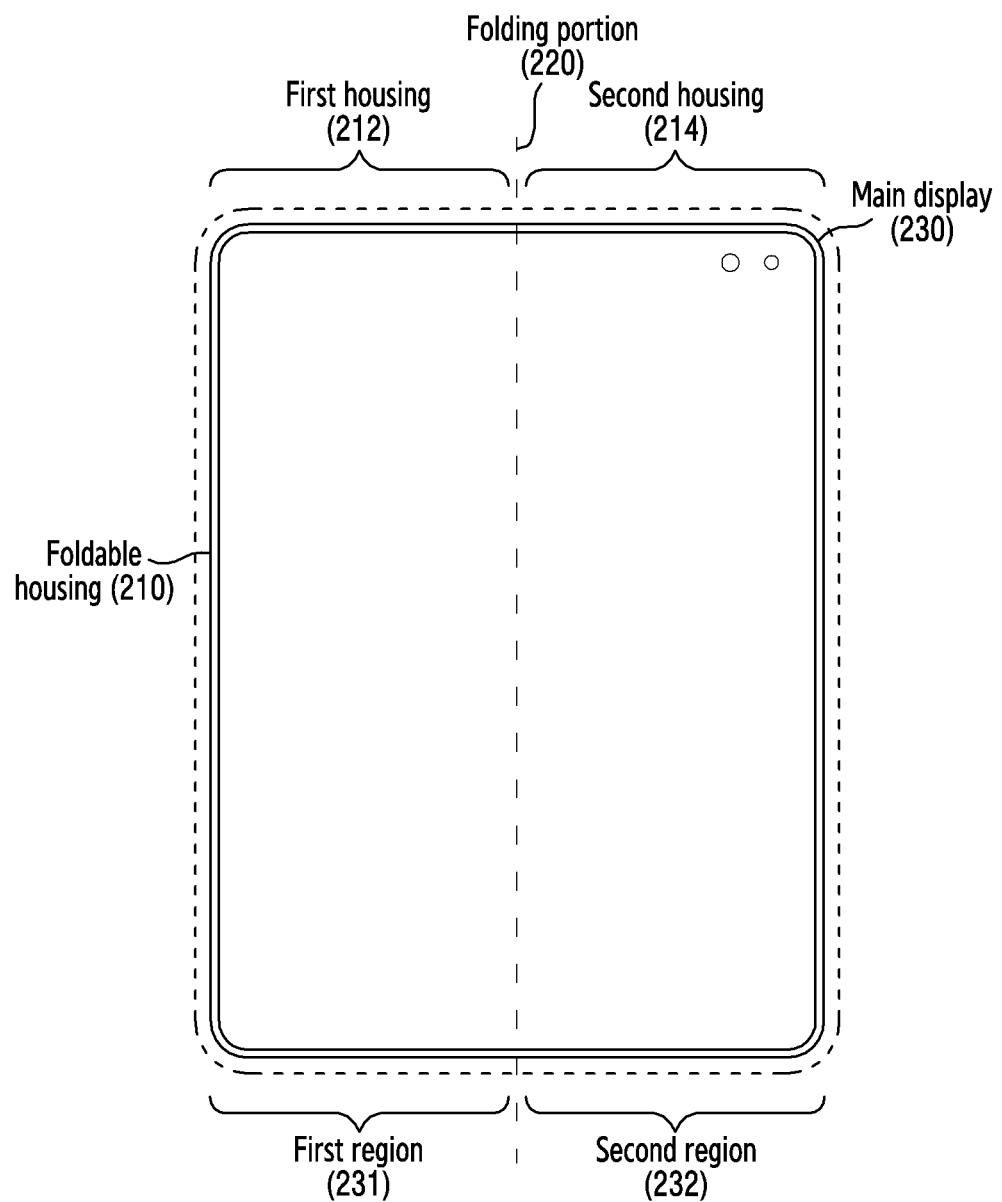
FIG. 2A is a front view illustrating an open state of an electronic device according to certain embodiments.
Figure 2B:
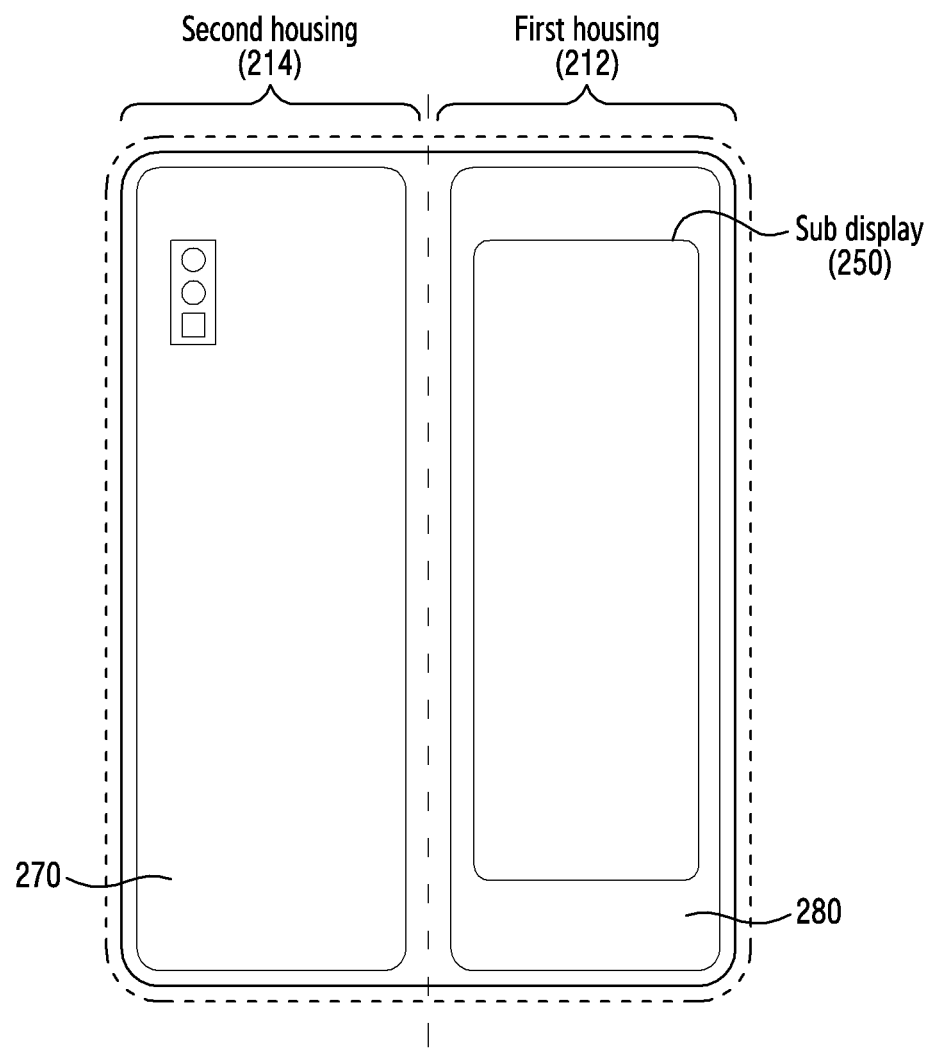
FIG. 2B is a rear view illustrating an open state of an electronic device according to certain embodiments.

FIG. 2A is a diagram illustrating an open state of an electronic device according to certain embodiments, and FIG. 2B is a diagram illustrating an open state of an electronic device according to certain embodiments. More specifically, FIG. 2A is a front view illustrating an open state of an electronic device according to certain embodiments, and FIG. 2B is a rear view illustrating an open state of an electronic device according to certain embodiments. In addition, FIG. 3A is a diagram illustrating closed states 300 and 310 of an electronic device according to certain embodiments, FIG. 3B is a diagram illustrating folded-in states 320 and 330 of an electronic device according to certain embodiments, and FIG. 4 is a diagram 400 illustrating sensors disposed on the electronic device. In the following description, the electronic device may include the electronic device 101 in FIG. 1.

1. Open State

Referring to FIG. 2A and FIG. 2B, the electronic device according to certain embodiments may include a foldable housing (or flexible housing) 210, a folding portion 220, a main display 230, and/or a sub display 250.

According to certain embodiments, the foldable housing 210 may include a first housing 212 and a second housing 214. The first housing 212 may include a first surface (or first front surface) and a third surface (or first rear surface) facing away from the first surface. The second housing 214 may include a second surface (or second front surface) and a fourth surface (or second rear surface) facing away from the second surface.

According to certain embodiments, the first housing 212 and the second housing 214 may be disposed on both sides of the folding portion 220, respectively, and may be connected by the folding portion 220. For example, the folding portion 220 may be coupled to a side surface of the first housing 212 and to a side surface of the second housing 214, which faces the side surface of the first housing 212, respectively, so as to pivotably (or rotatably) or foldably connect between the first housing 212 and the second housing 214. According to an embodiment, the first housing 212 may be connected to the second housing 214 through the folding portion 220, and may rotate with reference to the folding portion 220. In addition, the second housing 214 may be connected to the first housing 212 through the folding portion 220, and may rotate with reference to the folding portion 220. The first housing 212 and the second housing 214 may rotate with reference to the folding portion 220 such that the same are folded while facing each other.

According to certain embodiments, the main display 230 may be disposed on the first housing 212 and the second housing 214 across the folding portion 220. The main display 230 may be installed to be supported by the first housing 212 and the second housing 214. In certain embodiments, the main display 230 may be disposed on the first surface of the first housing 212 and on the second surface of the second housing 214 across the folding portion 220. The region of the main display 230 may be divided into different regions with reference to the folding portion 220. For example, the region of the main display 230 may be divided into a first region 231 and a second region 232.

According to certain embodiments, the sub display 250 may be disposed in a space formed by the first housing 212. At least a part of the sub display 250 may be visually exposed through the third surface (or first rear surface) of the first housing 212 or through a partial region of a first rear cover 280. However, this is only an example, and embodiments are not limited thereto. For example, the sub display 250 may be disposed in a space formed by the second housing 214 such that at least a part thereof is visually exposed through the fourth surface (or second rear surface) of the second housing 214 or through a partial region of a second rear cover 270.

According to an embodiment, the open state may refer to a state in which the first housing 212 faces in a fifth direction, and the second housing 214 faces in a sixth direction that is substantially identical to the fifth direction. For example, when the electronic device is folded out, the angle between the first surface of the first housing 212 and the second surface of the second housing 214 may be included in a predesignated first angle range. The predesignated first angle range may be larger than 150° and smaller than 180°. When the electronic device is folded out, the main display 230 may be exposed through the field of view of the user facing the front surface of the electronic device, and the sub display 250 may not be exposed.

2. Closed State

According to an embodiment, the closed state may refer to a state in which the first housing 212 and the second housing 214 are substantially overlapped or superimposed on each other. The substantially overlapped or superimposed state may refer to a state in which the angle between the first surface of the first housing 212 and the second surface of the second housing 214 is included in a predesignated second angle range, or the angle between the third surface of the first housing 212 and the fourth surface of the second housing 214 is included in the predesignated second angle range. The predesignated second angle range may be larger than 0° and smaller than 10°. For example, the closed state may correspond to the state 300 in FIG. 3A in which the first surface of the first housing 212 and the second surface of the second housing 214 face each other, or the state 310 in FIG. 3A in which the third surface of the first housing 212 and the fourth surface of the second housing 214 face each other. When the electronic device is in the closed state, the sub display 250 may be exposed through the field of view of the user facing the front surface of the electronic device, and the main display 230 may not be exposed.

3. Folded-in State

According to an embodiment, the folded-in state may correspond to an intermediate state between the open state and the closed state described above. For example, the folded-in state of the electronic device may correspond to the state 320 in FIG. 3B in which the angle between the first surface of the first housing 212 and the second surface of the second housing 214 is included in a predesignated third angle range, or to the state 330 in FIG. 3B in which the angle between the third surface of the first housing 212 and the fourth surface of the second housing 214 is included in the predesignated third angle range. The predesignated third angle range may be larger than 10° and smaller than 150°. When the electronic device is folded in, the main display 230 may be exposed through the field of view of the user facing the front surface of the electronic device, and the sub display 250 may not be exposed. In addition, depending on the degree of folding of the electronic device, at least a part (for example, sub display 250) of the rear surface of the electronic device may be exposed, and at least a part of the main display 230 may not be exposed.

Sensors

Various sensors can be used to detect the whether the electronic device is in the open state, the closed state, or the folded-in state.

According to certain embodiments, each of the first housing 212 and the second housing 214 may have a first sensor disposed thereon. For example, as illustrated in FIG. 4, at least one sensor capable of sensing deformation of the electronic device may be disposed on the first housing 212, the folding portion 220, and/or the second housing 214. The sensors capable of sensing deformation may include at least one of an inertia sensor 420, Hall IC sensors 430 and 440, a proximity sensor 410, a stretch sensor 450, or an angle encoder (or rotary sensor) 460. According to an embodiment, the inertia sensor 420 may be disposed in a space formed by the first housing 212 and in a space formed by the second housing 214. For example, the inertia sensor 420 may acquire information regarding acceleration, speed, direction, distance, or the like resulting from movements of the first housing 212 and/or the second housing 214. For example, the inertia sensor 420 may be disposed in a predetermined region with reference to the center of the first housing 212. According to an embodiment, the Hall IC sensors 430 and 440 may be disposed in spaces configured such that the first housing 212 and the second housing 214 can abut each other. The Hall IC sensors 430 and 440 may include transmitters for producing magnetic fields at specific frequencies and receivers for receiving the magnetic fields produced by the transmitters, thereby acquiring data regarding closing or folding-out of the first housing 212 and the second housing 214. In addition, the first housing 212 and the second housing 214 may have multiple Hall IC sensors disposed thereon. For example, at least one of a transmitter or a receiver of a first Hall IC sensor 430 may be disposed on a side surface of the first housing 212, which is connected to the folding portion 220, and the other thereof may be disposed on a side surface of the second housing 214. In addition, at least one of a transmitter or a receiver of a second Hall IC sensor 440 may be disposed on an end corresponding to a first direction of the first housing 212 (for example, leftward direction of the first housing 212), and the other thereof may be disposed on an end corresponding to a second direction of the second housing 214 (for example, rightward direction of the second housing 214), which is substantially opposite to the first direction.

According to an embodiment, the proximity sensor 410 may be disposed inside the first housing 212 or the second housing 214. For example, the proximity sensor 410 may be disposed on an end corresponding to a third direction of the first housing 212 (for example, upward direction of the first housing 212), or on an end corresponding to a fourth direction of the second housing 214 (for example, upward direction of the second housing 214), which is substantially identical to the third direction. For example, the proximity sensor 410 may be exposed to the outside of the electronic device through an opening formed in the first surface (for example, first front surface) of the first housing 212 or in the second surface (for example, second front surface) of the second housing 214, thereby acquiring data regarding proximity between the first housing 212 and the second housing 214. According to an embodiment, the stretch sensor 450 and the angle encoder 460 may be disposed on at least a part of the folding portion 220 connecting the first housing 212 and the second housing 214. For example, the stretch sensor 450 and the angle encoder 460 may acquire information regarding the angle of rotation of the first housing 212 and the second housing 214.

The above mentioned position in which at least one sensor is disposed is an example for helping understanding of certain embodiments, and certain embodiments are not limited thereto. For example, the position in which at least one sensor is disposed may be configured and/or changed by the designer and/or the user.

According to certain embodiments, the folding portion 220 may be configured with a hinge and a hinge cover (not illustrated), and the hinge may be covered by the hinger cover.

According to certain embodiments, the main display 230 may be coupled to a touch sensor (not illustrated) capable of detecting touch inputs such that the same is configured with an integrated touch screen. When the main display 230 is configured with a touch screen, the touch sensor may be disposed above the main display 230 or below the main display 230.

The above-mentioned configuration of the electronic device is an example, and the disclosure is not limited thereto. For example, the electronic device may include at least one component in addition to the above-mentioned configuration. The at least one component may include, as at least a part of the configuration described above with reference to FIG. 1, at least one camera, at least one sensor, at least one microphone, at least one speaker, and the like. Such at least one component may be disposed in a space formed by the first rear cover 280 of the first housing 212 or by the second rear cover 270 of the second housing 214.

The electronic device according to certain embodiments may reach a state in which the same is folded out by the folding portion 220 (or full open state). In addition, the electronic device may reach a state in which the same is folded in by the folding portion 220 (or partial open state) and/or a closed state.

The following angle ranges:

| Angle | Deformation State |
|---|---|
| 0-10 degrees | Closed |
| 10-150 degrees | Folded-In |
| 150-180 degrees | Open | used to determine the open state, folded-in state, and closed state are examples, and certain embodiments are not limited thereto. For example, the angle ranges used to determine the open state, folded-in state, or the closed state may be configured and/or changed by the designer and/or the user.

Different sensors have different characteristics. For example, the open state or closed state of the flexible-type electronic device may be determined by using the Hall IC sensor, but the characteristics of the Hall IC sensor may make it difficult to measure deformation equal to or larger than a specific angle. In addition, the folded-in state of the flexible-type electronic device may be determined by using the inertia sensor, but characteristics of the inertia sensor (errors accumulate as the measurement time increases) may degrade the precision of measurement results.

Accordingly, a processor can use at least one second sensor for determining the deformation state of the electronic device. At least one first sensor can be generally "always on" and continuously monitoring the state of the electronic device, such as a Hall IC sensor or an acceleration sensor. Based on information provided by the at least one first sensor, the processor can activate at least one second sensor. Data from the at least one first sensor and the at least one second sensor can be used to determine the deformation state of the electronic device.

Figure 5:
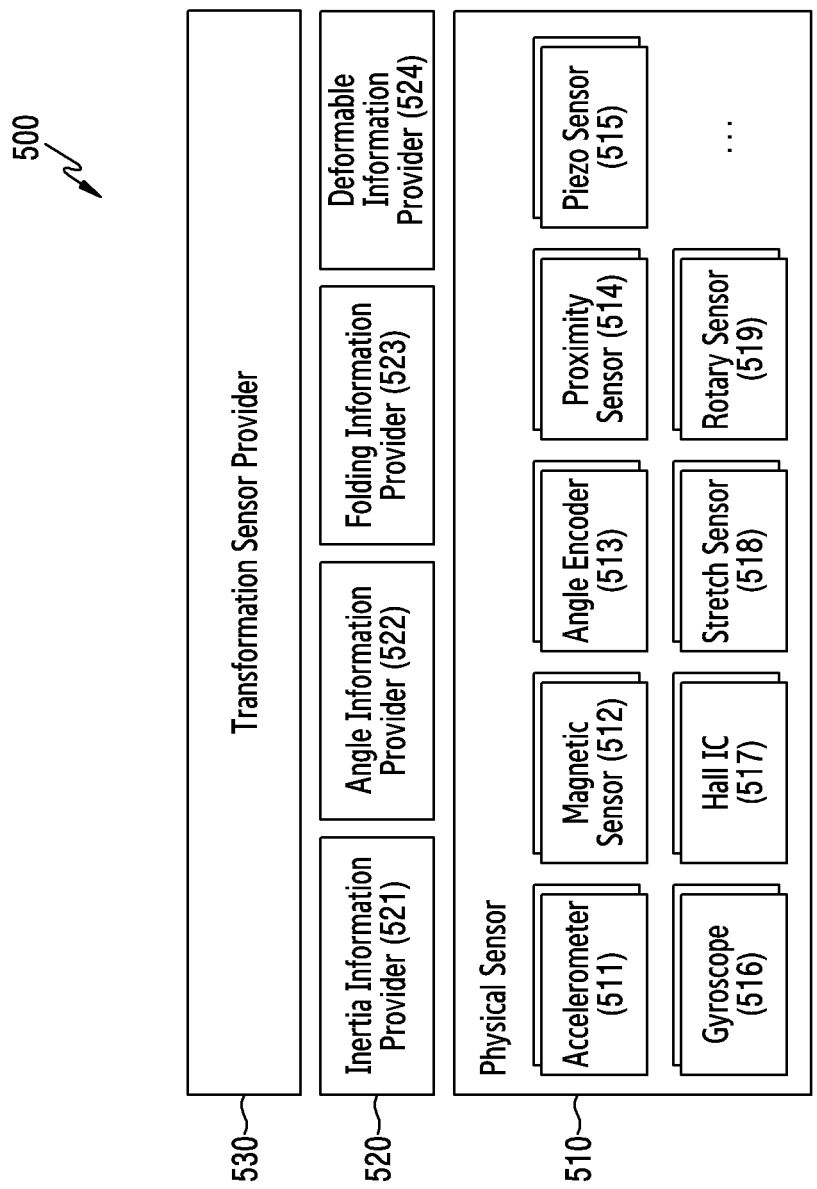
FIG. 5 is a diagram illustrating a sensor framework structure for identifying the deformation state of an electronic device according to certain embodiments.

FIG. 5 is a diagram 500 illustrating a sensor framework structure for determining the deformation state of an electronic device according to certain embodiments.

Referring to FIG. 5, the sensor framework may produce new information by combining pieces of information, which are acquired by various multiple physical sensors 510 in order to determine the deformation state of the electronic device, into a single piece of information. According to an embodiment, the sensor framework may include a combined information provider 520 configured to combine pieces of information acquired by various multiple physical sensors 510, and a deformation sensor provider 530 configured to provide sensor information, resulting from deformation of the electronic device, based on the information combined by the combined information provider 520.

According to an embodiment, the combined information provider 520 may include an inertia information provider 521, an angle information provider 522, a folding information provider 523, a deformation information provider 524, and the like. As described above, the combined information provider 520 may combine information acquired by at least some of the multiple physical sensors 510 disposed on the electronic device. For example, the inertia information provider 521 may combine pieces of information acquired by the acceleration sensor 511, the gyro sensor 516, and the like, thereby providing inertia information. In addition, the angle information provider 522 may combine information acquired by the acceleration sensor 511, the gyro sensor 516, the angle encoder 513, the Hall IC sensor 517, and the like, thereby providing angle information. In addition, the folding information provider 523 may combine information acquired by the angle encoder 513, the proximity sensor 514, the piezo sensor 515, the Hall IC sensor 517, and the rotary sensor 519, thereby providing folding information. In addition, the deformation information provider 524 may combine information acquired by the acceleration sensor 511, the magnetic sensor 512, the angle encoder 513, the proximity sensor 514, the piezo sensor 515, the gyro sensor 516, the Hall IC sensor 517, the stretch sensor 518, and the rotary sensor 519, thereby providing deformation information. However, this is only an example, and embodiments are not limited thereto. For example, the type of the combined information provider 520 and the type of the physical sensors 510 used by the combined information provider 520 may be configured and/or changed by the designer and/or the user.

According to an embodiment, the deformation sensor provider 530 may provide at least a part of the information combined by the combined information provider 520, as described above, as sensor information resulting from deformation of the electronic device.

An electronic device according to certain embodiments (for example, the electronic device 101 in FIG. 1) may include: a housing (for example, the foldable housing 210 in FIG. 2A); a flexible display (for example, the main display 230 in FIG. 2A) including a first portion (for example, the first housing 212 in FIG. 2A) and a second portion (for example, the second housing 214 in FIG. 2A) that are movable relative to each other; at least one first sensor (for example, at least a part of the physical sensor 510 in FIG. 5) disposed in the housing and configured to measure the relative position of the first portion and the second portion; at least one second sensor (for example, another part of the physical sensor 510 in FIG. 5) different from the at least one first sensor, the at least one second sensor being disposed in the housing and configured to measure the relative position of the first portion and the second portion; a processor (for example, the processor 120 in FIG. 1) disposed in the housing and operatively connected to the flexible display, the at least one first sensor, and the at least one second sensor; and a memory (for example, the memory 130 in FIG. 1) operatively connected to the processor. The memory may be configured to store instructions that, when executed, cause the processor to: acquire first data from the at least one first sensor; activate the at least one second sensor at least partially based on the acquired first data; acquire second data from the activated at least one second sensor; and sense a deformation state of the flexible display at least partially based on the acquired first or second data.

According to an embodiment, the instructions may be configured to cause the processor to monitor an initial state of the housing by using the at least one first sensor, after booting of the electronic device.

According to an embodiment, the at least one first sensor may include at least one of a Hall IC sensor (for example, the Hall IC sensor 517 in FIG. 5) or an acceleration sensor (for example, the acceleration sensor 511 in FIG. 5), which is disposed in the housing.

According to an embodiment, the at least one second sensor may include at least one of an angle encoder (for example, the angle encoder 513 in FIG. 5) or a rotary sensor (for example, the rotary sensor 519 in FIG. 5), which is disposed in the housing.

According to an embodiment, the memory may be configured to store accuracy information and/or current consumption information of the at least one first sensor and the at least one second sensor corresponding to the relative position and/or angle, and the instructions may be configured to cause the processor to activate the at least one second sensor at least partially based on the first data and the information.

According to an embodiment, the memory may be configured to store information regarding the at least one first sensor and the at least one second sensor corresponding to an application, and the instructions may be configured to cause the processor to activate the at least one second sensor at least partially based on the first data and the information.

According to an embodiment, the flexible display may further include third portions that are changeable relative to each other in position and/or angle; the memory may be configured to store information regarding the at least one first sensor and the at least one second sensor corresponding to a folding type of the flexible display; and the instructions may be configured to cause the processor to determine the folding type of the flexible display at least partially based on the first data and to activate the at least one second sensor based on the determined folding type and the information.

According to an embodiment, the instructions may be configured to cause the processor to activate the at least one second sensor and then to deactivate the at least one first sensor.

According to an embodiment, the electronic device may further include at least one third sensor (for example, another part of the physical sensor 510 in FIG. 5) different from the at least one first sensor and the at least one second sensor, the third sensor being disposed in the housing and configured to measure the relative position and/or angle of the first portion and the second portion. The instructions may be configured to cause the processor to: activate the at least one third sensor when the sensed deformation state of the flexible display satisfies a designated condition; acquire third data by using the activated third sensor; and monitor the deformation state of the flexible display based on the acquired third data. The at least one third sensor may include a gyro sensor (for example, the gyro sensor 516 in FIG. 5).

According to an embodiment, the instructions may be configured to cause the processor to determine an output scheme regarding the first portion and the second portion based on the sensed deformation state of the flexible display.

Figure 6:
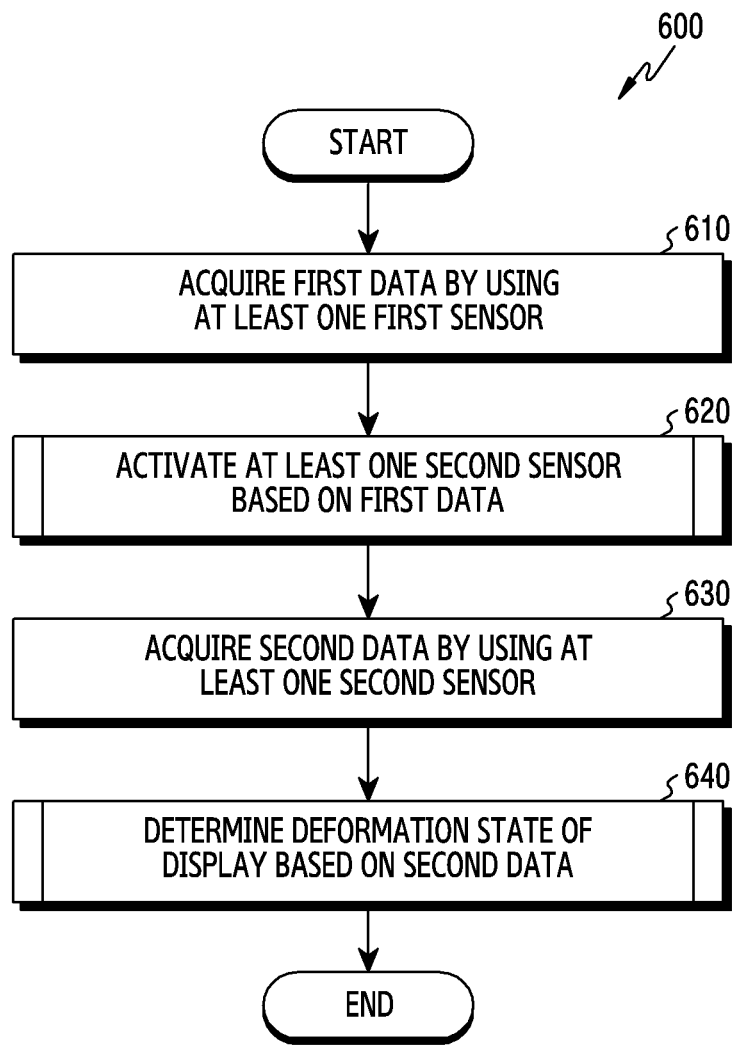
FIG. 6 is a flowchart for identifying the deformation state of an electronic device in connection with an electronic device according to certain embodiments.

FIG. 6 is a flowchart 600 for identifying the deformation state of an electronic device in connection with an electronic device according to certain embodiments. Various operations in the following embodiment may be performed successively, but are not necessary performed successively. For example, the order of respective operations may be changed, and at least two operations may be performed in a parallel manner.

Referring to FIG. 6, according to certain embodiments, the electronic device 101 (for example, the processor 120 in FIG. 1) may acquire first data by using at least one first sensor in operation 610. For example, the at least one first sensor may be some of sensors provided in the electronic device 101. For example, the first data may be acquired by at least one of an inertia sensor, a magnetic sensor, a Hall IC sensor, a proximity sensor, an angle encoder, a stretch sensor, or a rotary sensor. As another example, the at least one first sensor may correspond to the entire sensors provided in the electronic device 101. For example, the first data may be acquired by an inertia sensor, a geomagnetic sensor, a Hall IC sensor, a proximity sensor, an angle encoder, a stretch sensor, or a rotary sensor. According to an embodiment, the at least one first sensor may be activated by a predesignated event. The predesignated event may be related to at least one of power-on (or booting), execution of a predesignated application, a predesignated user input, or the battery state of the electronic device 101. According to an embodiment, the first data may be related to the relative position and/or angle of at least a part of the first housing and at least a part of the second housing in the initial state of the electronic device 101 (for example, foldable housing 210) after the predesignated event occurred. For example, the first data may be information combined by at least one combined information provider 520, as described above with reference to FIG. 5.

According to certain embodiments, the electronic device 101 (for example, the processor 120 in FIG. 1) may process activation of at least one second sensor based on the first data in operation 620. According to an embodiment, the processor 120 may determine the primary deformation state regarding the electronic device 101 based on the first data. In addition, the processor 120 may activate at least one second sensor for acquiring second data used to determine the secondary deformation state based on the primary deformation state. For example, at least a part of the at least one second sensor for acquiring the second data may differ from the at least one first sensor activated to acquire the first data. For example, when the first data is acquired by the inertia sensor and the Hall IC sensor, the processor 120 may activate at least one of the proximity sensor, the angle encoder, the stretch sensor, or the rotary sensor, in order to acquire second data. The processor 120 may deactivate at least one first sensor or may maintain activation of at least a part of the activated first sensor.

According to certain embodiments, the electronic device 101 (for example, the processor 120 in FIG. 1) may acquire second data by using at least one activated second sensor in operation 630. According to an embodiment, the second data may be information provided by at least one combined information provider 520 or deformation sensor provider 530 as described above with reference to FIG. 5.

According to certain embodiments, the electronic device 101 (for example, the processor 120 in FIG. 1) may determine the deformation state of the display based on at least a part of the second data in operation 640. For example, the processor 120 may determine the secondary deformation state regarding the electronic device 101 based on at least a part of the second data. However, this is only an example, and embodiments are not limited thereto. For example, the processor 120 may use at least a part of the first data to determine the secondary deformation state regarding the electronic device 101.

Figure 7:
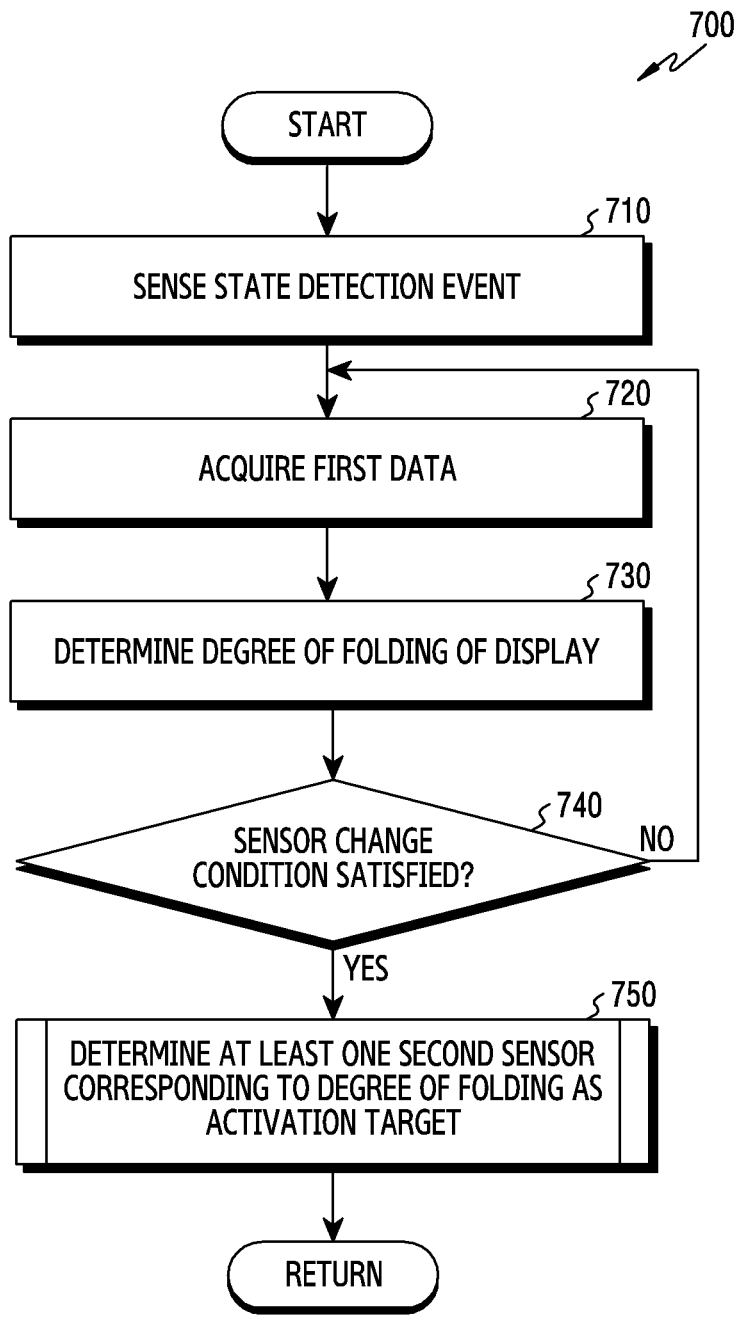
FIG. 7 is a flowchart for activating at least one second sensor in connection with an electronic device according to certain embodiments.

FIG. 7 is a flowchart 700 for activating at least one second sensor in connection with an electronic device according to certain embodiments. Operations in FIG. 7, described below, may correspond to certain embodiments of operations 610 and 620 in FIG. 6. Various operations in the following embodiment may be performed successively, but are not necessary performed successively. For example, the order of respective operations may be changed, and at least two operations may be performed in a parallel manner.

Referring to FIG. 7, according to certain embodiments, the electronic device 101 (for example, the processor 120 in FIG. 1) may sense a state detection event in operation 710. The state detection event refers to a predesignated event for detecting the deformation state of the electronic device 101, and may be related to at least one of power-on, execution of a predesignated application, a predesignated user input, or the battery state of the electronic device 101, as described above.

According to certain embodiments, the electronic device 101 (for example, the processor 120 in FIG. 1) may process acquisition of first data in operation 720. According to an embodiment, the processor 120 may acquire first data by using at least one first sensor.

According to certain embodiments, the electronic device 101 (for example, the processor 120 in FIG. 1) may determine the degree of folding of the display based on at least a part of the first data in operation 730. The degree of folding may be based on the angle between the first region 231 and the second region 232 of the display.

According to certain embodiments, the electronic device 101 (for example, the processor 120 in FIG. 1) may confirm, based on the degree of folding of the display, whether or not a sensor change condition is satisfied, in operation 740. According to an embodiment, the processor 120 may confirm whether or not a sensor change condition is satisfied, based on predesignated sensor driving information and the current degree of folding of the display. The driving information may correspond to information regarding definition of sensors (for example, corresponding sensors) that are driven so as to correspond to the degree of folding of the display, as in the example given in Table 1 below:

TABLE 1

| Degree of folding | Corresponding sensors | Accuracy |
|---|---|---|
| First range (0°-1°) | Hall IC sensor, inertia sensor | Hall IC sensor > inertia sensor |
| Second range (2°-30°) | Hall IC sensor, proximity sensor, inertia sensor | Hall IC sensor > proximity sensor > inertia sensor |
| Third range (31°-120°) | Inertia sensor, rotary sensor | Rotary sensor > inertia sensor |
| . . . | . . . | . . . |
| $n^{th}$ range (179°-181°) | Hall IC sensor, inertia sensor, angle encoder, stretch sensor | Hall IC sensor > inertia sensor > angle encoder > stretch sensor |

For example, the processor 120 may identify at least one corresponding sensor, which corresponds to the current degree of folding of the display, based on sensor driving information. In addition, the processor 120 may confirm whether or not the currently driven sensor, for example, at least one first sensor currently driven, is identical to at least one corresponding sensor identified. For example, the processor 120 may confirm that the sensor change condition is not satisfied, if the at least one sensor is identical to the at least one corresponding sensor. In addition, the processor 120 may confirm that the sensor change condition is satisfied, if the at least one sensor is not identical to the at least one corresponding sensor.

According to another embodiment, the driving information may include additional information regarding definition of the amount of current consumed by corresponding sensors, as in the example given in Table 2 below:

TABLE 2

| Degree of folding | Corresponding sensors | Current consumption |
|---|---|---|
| First range (0°-1°) | Hall IC sensor, inertia sensor | Inertia sensor > Hall IC sensor |
| Second range (2°-30°) | Hall IC sensor, proximity sensor, inertia sensor | Inertia sensor > Hall IC sensor < proximity sensor |
| Third range (31°-120°) | Inertia sensor, rotary sensor | Inertia sensor > rotary sensor |
| . . . | . . . | . . . |
| $n^{th}$ range (179°-181°) | Hall IC sensor, inertia sensor, angle encoder, stretch sensor | Angle encoder > stretch sensor > inertia sensor > Hall IC sensor |

For example, the processor 120 may identify at least one corresponding sensor, which corresponds to the current degree of folding of the display, based on the current consumption among the sensor driving information. In addition, the processor 120 may confirm whether or not the currently driven sensor, for example, at least one first sensor currently driven, is identical to at least one corresponding sensor identified. For example, the processor 120 may confirm that the sensor change condition is not satisfied, if the at least one first sensor is identical to the at least one corresponding sensor. In addition, the processor 120 may confirm that the sensor change condition is satisfied, if the at least one first sensor is not identical to the at least one corresponding sensor.

According to certain embodiments, when it is confirmed, based on the degree of folding of the display, that the sensor change condition is satisfied, the electronic device 101 (for example, the processor 120 in FIG. 1) may determine at least one second sensor, which corresponds to the degree of folding, as an activation target in operation 750. For example, in response to determining that the degree of folding is included in a first range, based on Table 1 described above, the processor 120 may determine the Hall IC sensor and the inertia sensor as activation targets for acquiring second data. In addition, in response to determining that the degree of folding is included in an $n^{th}$ range, based on Table 1 described above, the processor 120 may determine the Hall IC sensor, the inertia sensor, the angle encoder, and the stretch sensor as activation targets for acquiring second data.

As another example, in response to determining that the degree of folding is included in the first range, based on Table 1 described above, the processor 120 may determine the Hall IC sensor, which has a relatively high accuracy among the corresponding sensors corresponding to the first range, as a activation target for acquiring second data. In addition, in response to determining that the degree of folding is included in the $n^{th}$ range, based on Table 1 described above, the processor 120 may determine the Hall IC sensor as an activation target for acquiring second data, based on the accuracy, among the Hall IC sensor, the inertia sensor, the angle encoder, and the stretch sensor.

As another example, in response to determining that the degree of folding is included in the first range, based on Table 2 described above, the processor 120 may determine the Hall IC sensor, which consumes a small amount of current, as a activation target for acquiring second data, among the Hall IC sensor or the inertia sensor. In addition, in response to determining that the degree of folding is included in the $n^{th}$ range, based on Table 2 described above, the processor 120 may determine the Hall IC sensor, which consumes a small amount of current, as an activation target for acquiring second data, among the Hall IC sensor, the inertia sensor, the angle encoder, and the stretch sensor. The examples of driving information as in Table 1 and Table 2, mentioned in the above-described embodiments, are examples for helping understanding of certain embodiments, and the disclosure is not limited thereto. For example, information regarding the degree of folding, corresponding sensors, accuracy, or power consumption defined in the driving information may be configured and/or changed by designer and/or the user. According to certain embodiments, the determined activation target may be at least one combined information provider 520 or deformation sensor provider 530, as described with reference to FIG. 5.

According to certain embodiments, when it is confirmed as a result of performing operation 740 that the sensor change condition is not satisfied, the electronic device 101 (for example, the processor 120 in FIG. 1) may perform an operation of confirming whether or not the sensor change condition is satisfied. For example, the processor 120 may perform at least one of operations 720 to 740.

Figure 8A:
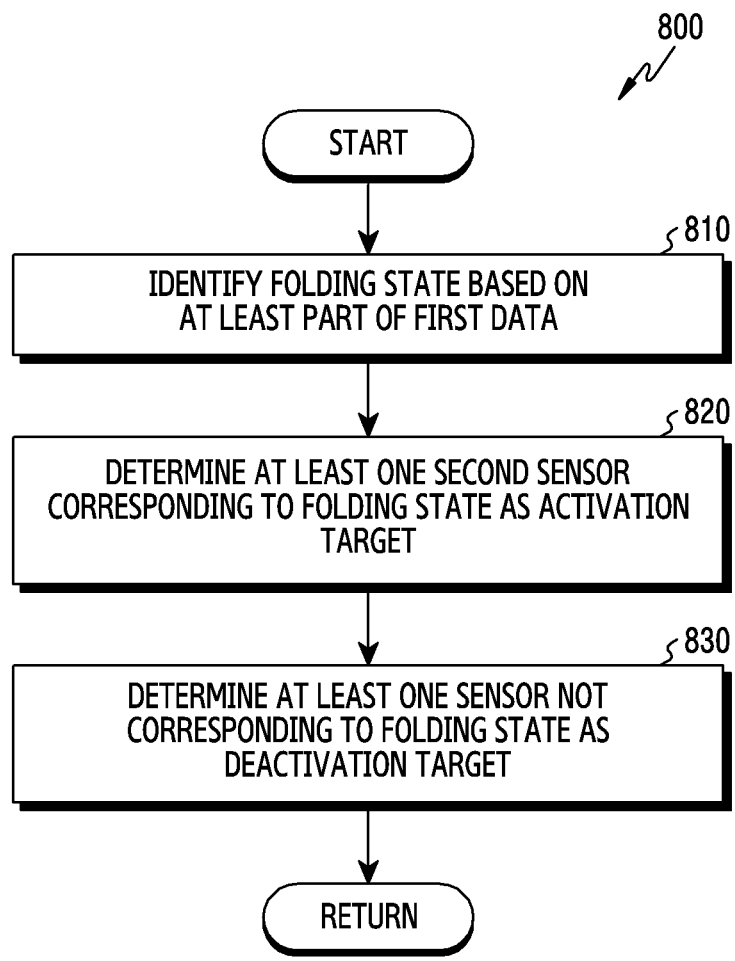
FIG. 8A is a flowchart for determining at least one second sensor as an activation target in connection with an electronic device according to certain embodiments.
Figure 8B:
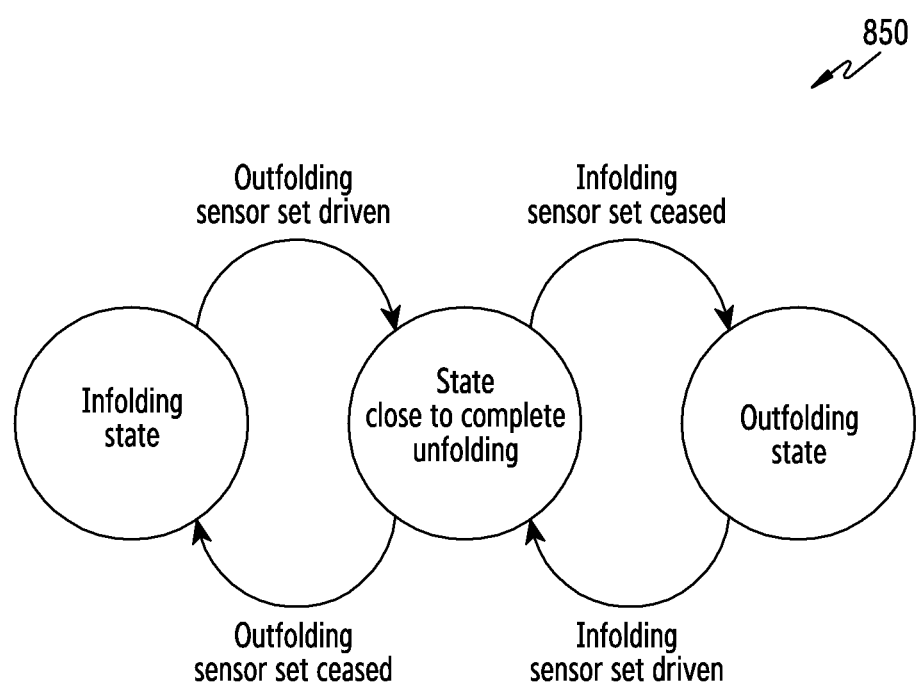
FIG. 8B is a diagram for describing a sensor control operation of an electronic device according to certain embodiments.

FIG. 8A is a flowchart 800 for determining at least one second sensor as an activation target in connection with an electronic device according to certain embodiments. FIG. 8B is a diagram 850 for describing a sensor control operation of an electronic device according to certain embodiments. Operations in FIG. 8A to be described below may correspond to certain embodiments of operation 750 in FIG. 7.

In addition, various operations in the following embodiment may be performed successively, but are not necessary performed successively. For example, the order of respective operations may be changed, and at least two operations may be performed in a parallel manner.

Referring to FIG. 8A, according to certain embodiments, the electronic device 101 (for example, the processor 120 in FIG. 1) may identify the folding state (or folding kind or folding type) regarding the electronic device 101 (or main display 230) based on at least a part of first data in operation 810. The folding state may be related to the folding direction of the electronic device 101. For example, the folding state may include a first folding state and a second folding state. The first folding state may correspond to a state (for example, in-folding) in which the first surface (for example, first front surface) of the first housing 212 of the electronic device 101 and the second surface (for example, second front surface) of the second housing 214 are disposed to face each other (for example, a situation in which the third surface (for example, the first rear surface) of the first housing 212 or the fourth surface (for example, second rear surface) of the second housing 214 is exposed). In addition, the second folding state may correspond to a state (for example, out-folding) in which the third surface of the first housing 212 of the electronic device 101 and the fourth surface of the second housing 214 are disposed to face each other (for example, a situation in which the first surface of the first housing 212 or the second surface of the second housing 214 is exposed).

According to certain embodiments, the electronic device 101 (for example, the processor 120 in FIG. 1) may determine at least one second sensor, which corresponds to the folding state, as an activation target in operation 820.

According to certain embodiments, the electronic device 101 (for example, the processor 120 in FIG. 1) may determine at least one sensor, which does not correspond to the folding state, as a deactivation target in operation 830. The processor 120 may process the at least one sensor, which has been determined as a deactivate target, so as to switch to a deactivated state. According to an embodiment, when the electronic device 101 switches from a first folding state (for example, in-folding state) to an unfolding state (for example, a state close to complete unfolding) as illustrated in FIG. 8B, the processor 120 may determine at least one sensor (for example, out-folding sensor set) related to a second folding state (for example, out-folding state) as an activation (for example, driving) target. In addition, when the electronic device 101 switches from the unfolded state to the second folding state, the processor 120 may process at least one sensor (for example, in-folding sensor set) related to the first folding state so as to be deactivated (for example, ceased). On the other hand, when the electronic device 101 switches from the second folding state to the unfolding state, the processor 120 may process at least one deactivated sensor (for example, in-folding sensor set) related to the first folding state so as to be activated. In addition, when the electronic device 101 switches from the unfolding state to the first folding state, the processor 120 may process at least one sensor (for example, out-folding sensor set) related to the second folding state to be deactivated.

More than One Folding Portion

The disclosure is not limited to an electronic device with only one folding portion. For example, in certain embodiments, the housing of the electronic device can be foldable along more than one axis. For example, in FIG. 10A, the electronic device can have a first folding portion 1012, a second folding portion 1014, and a third folding portion 1016. The electronic device can have a variety of folding states, such as depicted in FIGS. 10A-10D.

Figure 9:
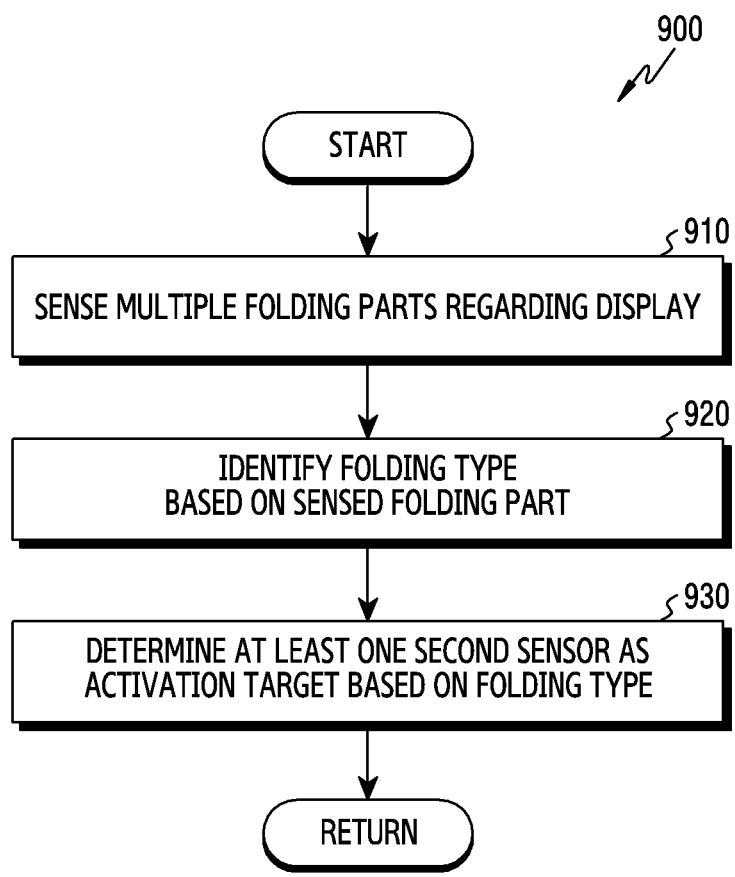
FIG. 9 is a flowchart for determining at least one second sensor as an activation target in connection with an electronic device according to certain embodiments.
Figure 10A:
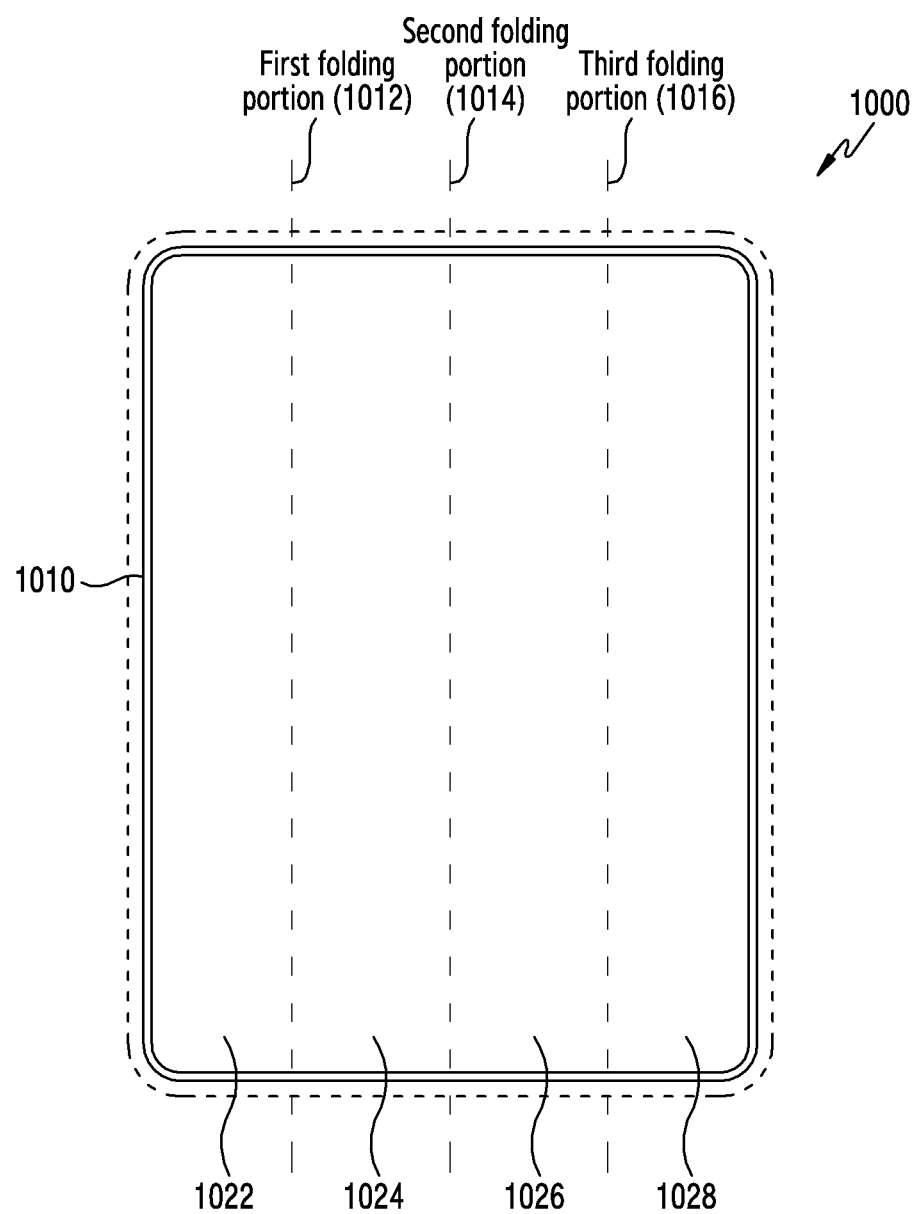
FIG. 10A is a diagram for describing a folded-in state of an electronic device according to certain embodiments.
Figure 10B:
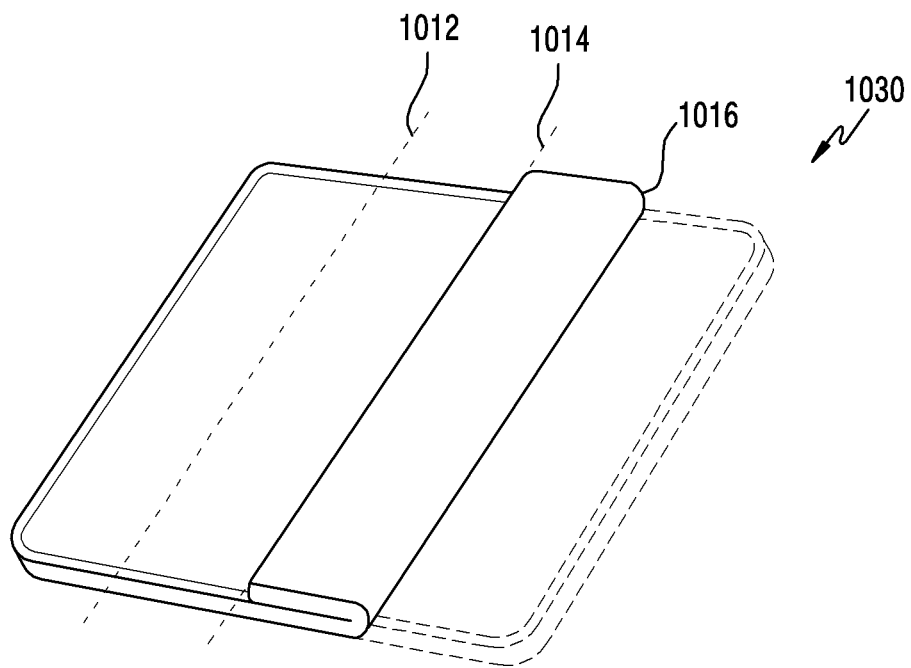
FIG. 10B is a diagram for describing a folded-in state of an electronic device according to certain embodiments.
Figure 10B:
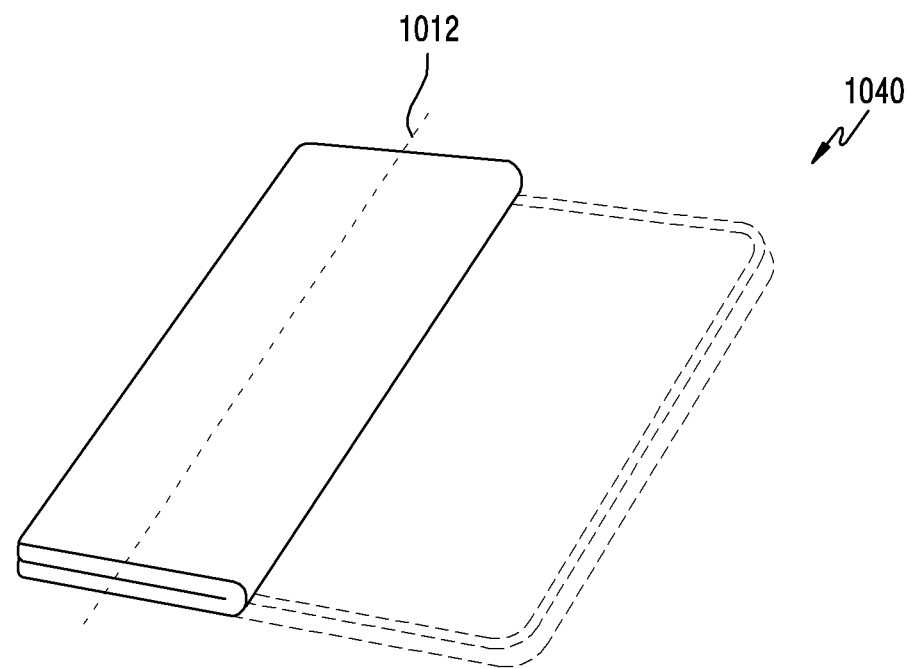
Figure 10C:
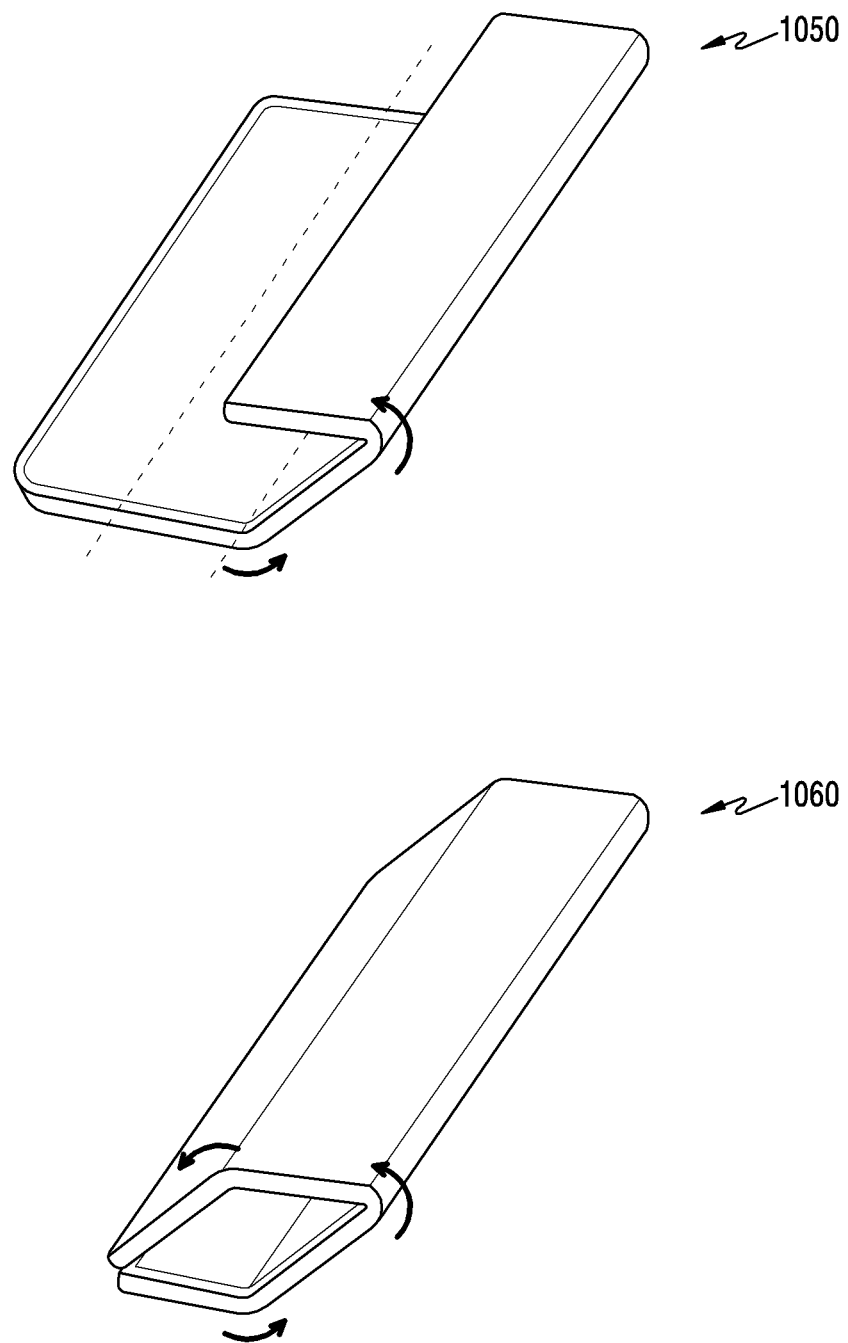
FIG. 10C is a diagram for describing a folded-in state of an electronic device according to certain embodiments.
Figure 10D:
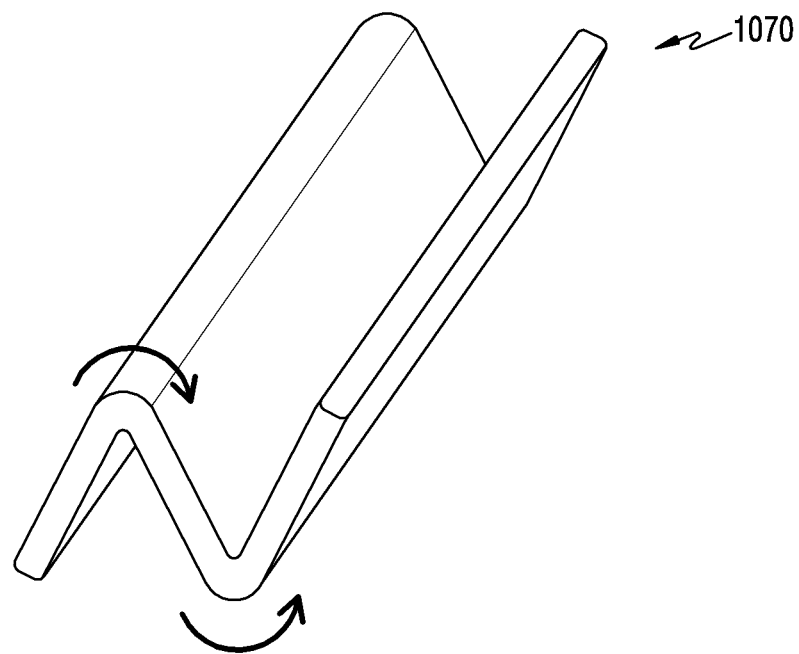
FIG. 10D is a diagram for describing a folded-in state of an electronic device according to certain embodiments.
Figure 10D:
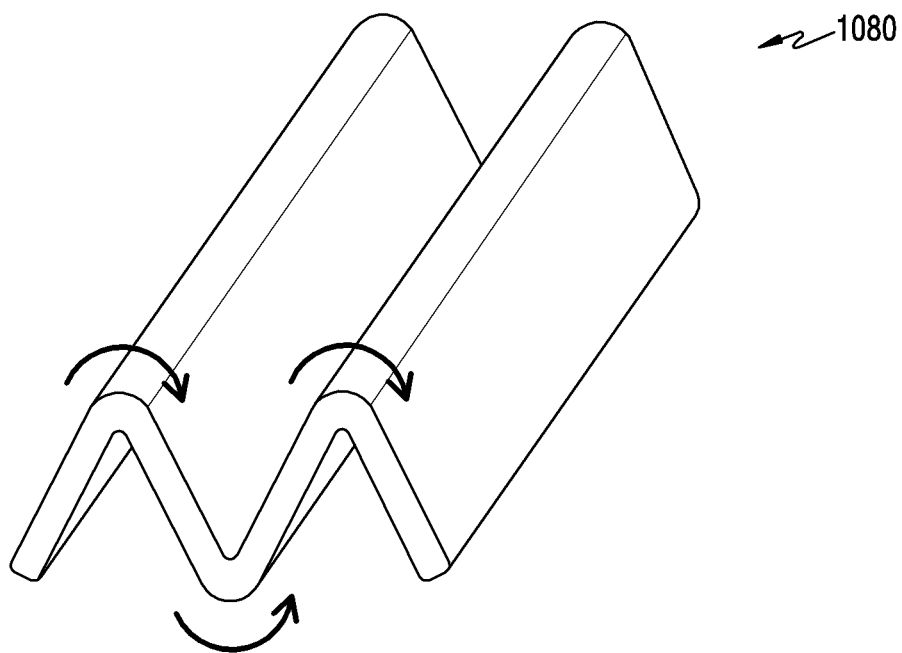

FIG. 9 is a flowchart 900 for determining at least one second sensor as an activation target in connection with an electronic device according to certain embodiments. FIG. 10A is a diagram for describing a folding state of an electronic device according to certain embodiments, FIG. 10B is a diagram for describing a folding state of an electronic device according to certain embodiments, FIG. 10C is a diagram for describing a folding state of an electronic device according to certain embodiments, and FIG. 10D is a diagram for describing a folding state of an electronic device according to certain embodiments. Operations in FIG. 9 described below may correspond to certain embodiments of operation 750 in FIG. 7. In addition, various operations in the following embodiment may be performed successively, but are not necessary performed successively. For example, the order of respective operations may be changed, and at least two operations may be performed in a parallel manner.

Referring to FIG. 9, according to certain embodiments, the electronic device 101 (for example, the processor 120 in FIG. 1) may sense multiple folding portions with regard to the display in operation 910. For example, as illustrated in FIG. 10A, the electronic device 101 may include (1000) multiple folding portions (for example, first folding portion 1012, second folding portion 1014, and third folding portion 1016). In addition, the display 1010 may be divided into multiple regions with reference to the multiple folding portions 1012, 1014, and 1016. For example, the display 1010 may be divided into a first region 1022, a second region 1024, a third region 1026, and a fourth region 1028. According to an embodiment, the processor 120 may sense parts, folding of which through the multiple folding portions 1012, 1014, and 1016 is sensed.

According to certain embodiments, the electronic device 101 (for example, the processor 120 in FIG. 1) may identify the folding type (or folding kind or folding state) regarding the electronic device 101 (or main display 230) based on the sensed folding parts in operation 920. The folding type, which is related to the state of the electronic device 101, may be an open state (or full open state), a folded-in state (or partial open state), and/or a closed state, as described above with reference to FIG. 2A to FIG. 3B. According to an embodiment, the processor 120 may determine the folding type based on at least one of the number of parts, folding of which has been sensed, or the direction in which the folding has occurred. For example, when folding is sensed by one folding portion, the processor 120 may determine a folding type corresponding to a fully closed state or a partially closed state. For example, when folding occurring to the third folding portion (or first folding portion) is sensed as in the case of 1030 in FIG. 10B, the processor 120 may determine a partially closed state in which at least a part of the display is exposed. In addition, when folding occurring to the second folding portion is sensed as in the case of 1040 in FIG. 10B, the processor 120 may determine a completely closed state in which the display is not exposed. As another example, when folding is sensed by at least two folding portions, the processor 120 may determine a folding type corresponding to a partially rolled state or a completely rolled state. For example, when folding in the same direction occurring to the third folding portion (or first folding portion) and the second folding portion is sensed as in the case of 1050 in FIG. 10C, the processor 120 may determine a partially rolled state in which at least a part of the display is exposed. In addition, when folding in the same direction occurring to the first folding portion, the second folding portion, and the third folding portion is sensed as in the case of 1060 in FIG. 10C, the processor 120 may determine a completely rolled state in which the display is not exposed. In addition, when folding in at least different directions occurring to the third folding portion (or first folding portion) and the second folding portion is sensed as in the case of 1070 and 1080 in FIG. 10D, the processor 120 may determine an "N"-type or "M"-type state in which at least a part of the display is exposed.

According to certain embodiments, the electronic device 101 (for example, the processor 120 in FIG. 1) may determine at least one second sensor as an activation target, based on the determined folding type, in operation 930. According to an embodiment, the processor 120 may determine at least one second sensor, which corresponds to the folding type, among the sensors provided in the electronic device 101 as an activation target. For example, the activation target may be at least one combined information provider 520 or deformation sensor provider 530, as described above with reference to FIG. 5.

Figure 11:
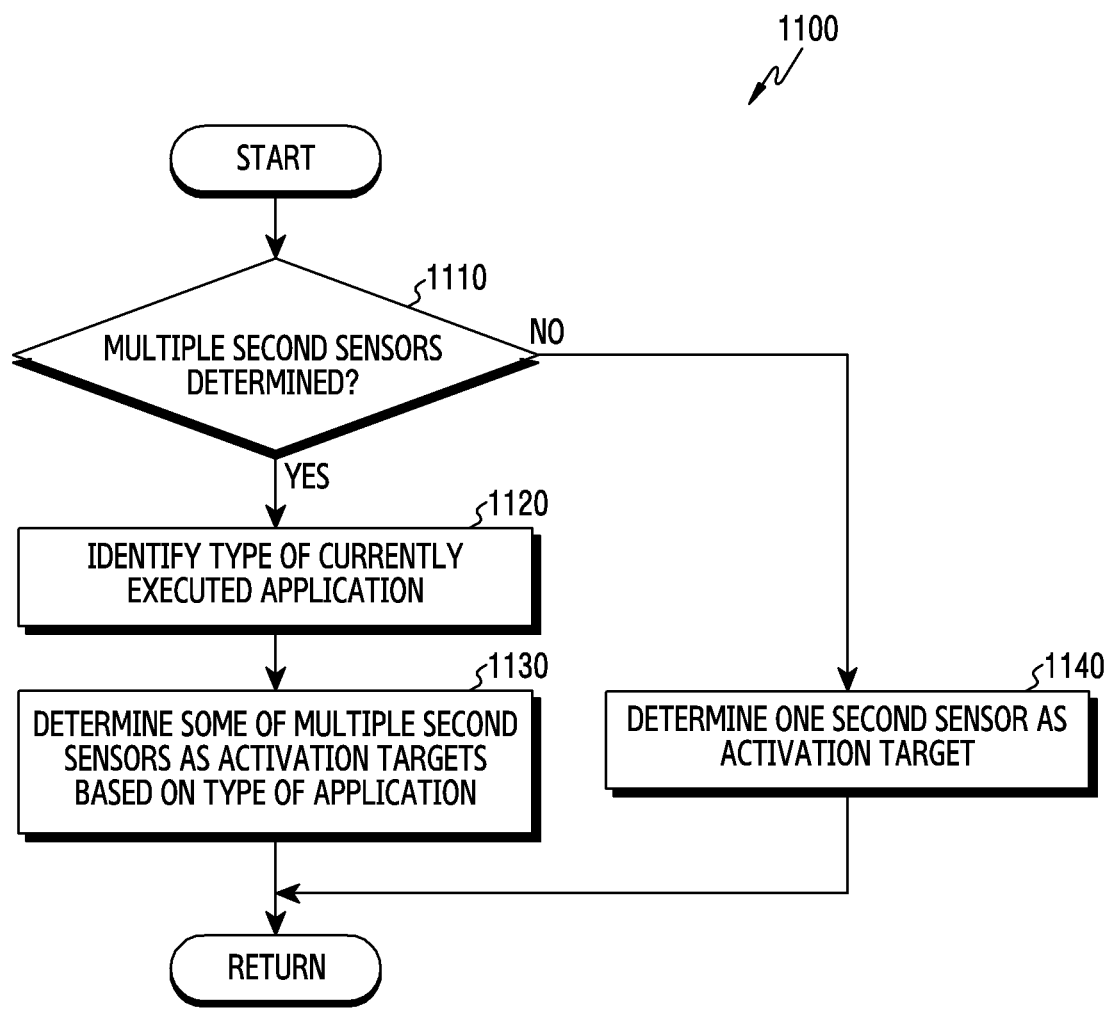
FIG. 11 is another flowchart for determining at least one second sensor as an activation target in connection with an electronic device according to certain embodiments.

FIG. 11 is a flowchart 1100 for determining at least one second sensor as an activation target in connection with an electronic device according to certain embodiments. Operations in FIG. 11, described below, may correspond to certain embodiments of operation 750 in FIG. 7. Various operations in the following embodiment may be performed successively, but are not necessary performed successively. For example, the order of respective operations may be changed, and at least two operations may be performed in a parallel manner.

Referring to FIG. 11, according to certain embodiments, the electronic device 101 (for example, the processor 120 in FIG. 1) may determine whether or not multiple second sensors are determined as activation targets in operation 1110.

According to certain embodiments, when a single second sensor is determined as an activation target, the electronic device 101 (for example, the processor 120 in FIG. 1) may process the single second sensor, which has been determined as an activation target, to be activated in operation 1140.

According to certain embodiments, when multiple second sensors are determined as activation targets, the electronic device 101 (for example, the processor 120 in FIG. 1) may determine the type of a currently executed application in operation 1120. The type of the application may include a first type of application using a first level of deformation state and a second type of application using a second level of deformation state. The first level of deformation state may include a open state of the electronic device 101 or a closed state of the electronic device 101. The second level of deformation state may further include a folded-in state besides the first level of deformation state.

According to certain embodiments, the electronic device 101 (for example, the processor 120 in FIG. 1) may determine at least some of multiple second sensors, which have been determined as activation targets, as activation targets based on the application type and at least one piece of sensor information (for example, sensor driving information) corresponding to at least one stored application (or application type) in operation 1130. The driving information may be information regarding definition of sensors (for example, corresponding sensors) that are driven so as to correspond to application types, as in the example given in Table 3 below:

TABLE 3

| Application type | Corresponding sensors |
| --- | --- |
| First type | Hall IC sensor, proximity sensor |
| Second type | Hall IC sensor, angle encoder, stretch sensor, rotary sensor, magnetic sensor |

For example, when execution of an application of the first type is identified, the processor 120 may determine a sensor capable of detecting the first level of deformation state as an activation target. In addition, when execution of an application of the second type is identified, the processor 120 may determine a sensor capable of detecting the second level of deformation state as an activation target. According to certain embodiments, the activation target may be at least one combined information provider 520 or deformation sensor provider 530, as described above with reference to FIG. 5.

Figure 12:
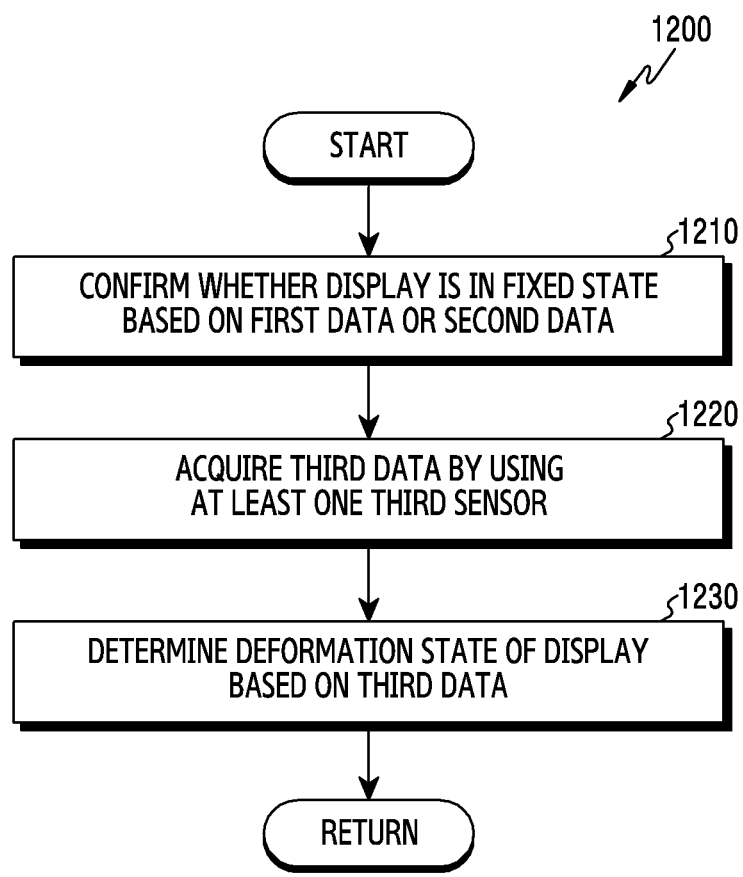
FIG. 12 is a flowchart for determining the deformation state of a display in connection with an electronic device according to certain embodiments.

FIG. 12 a flowchart 1200 for determining the deformation state of a display in connection with an electronic device according to certain embodiments. Operations in FIG. 12, described below, may correspond to certain embodiments of operation 640 in FIG. 6. Various operations in the following embodiment may be performed successively, but are not necessary performed successively. For example, the order of respective operations may be changed, and at least two operations may be performed in a parallel manner.

Referring to FIG. 12, according to certain embodiments, the electronic device 101 (for example, the processor 120 in FIG. 1) may confirm whether or not the display is in a fixed state based on at least a part of first data or at least a part of second data in operation 1210. According to an embodiment, the fixed state of the display may correspond to a state in which the first housing 212 and the second housing 214 of the electronic device 101 capable of folding and unfolding maintain a predesignated angle, as in the case of a laptop.

According to certain embodiments, the electronic device 101 (for example, the processor 120 in FIG. 1) may acquire third data by using at least one third sensor in response to confirming a fixed state of the display in operation 1220. According to an embodiment, the at least one third sensor may include at least one sensor capable of measuring the angle between the first and second housings. For example, the at least one third sensor may be at least one combined information provider 520 or deformation sensor provider 530 as described above with reference to FIG. 5.

According to certain embodiments, the electronic device 101 (for example, the processor 120 in FIG. 1) may determine the deformation state of the display based on at least a part of the third data in operation 1230.

Based on the deformation state, the electronic device can determine how to change the output scheme on the display.

Changing the Output Scheme Based on Deformation State

FIG. 13 is a flowchart 1300 for changing the display output scheme based on the deformation state of the display in connection with an electronic device according to certain embodiments. FIG. 14 is a diagram 1400 for describing an operation of for changing the output scheme based on the deformation state in connection with an electronic device according to certain embodiments. Operations in FIG. 13, described below, may correspond to certain embodiments of operation 640 in FIG. 6. Various operations in the following embodiment may be performed successively, but are not necessary performed successively. For example, the order of respective operations may be changed, and at least two operations may be performed in a parallel manner.

Referring to FIG. 13, according to certain embodiments, the electronic device 101 (for example, the processor 120 in FIG. 1) may output an execution screen by using a first display and a second display in operation 1310. According to an embodiment, the first display may correspond to the first region (for example, first region 231 in FIG. 2) of the main display (for example, the main display 230 in FIG. 2), and the second display may correspond to the second region (for example, the second region 232 in FIG. 2) of the main display 230.

According to certain embodiments, the electronic device 101 (for example, the processor 120 in FIG. 1) may confirm whether or not the deformation state of the display satisfies a designated condition in operation 1320. According to an embodiment, the designated condition may be a reference angle for changing the currently configured display output scheme. According to an embodiment, when display deformation exceeding the designated angle is sensed, the processor 120 may confirm that the designated condition is satisfied. In addition, when display deformation within the designated angle is sensed, the processor 120 may confirm that the designated condition is not satisfied.

According to certain embodiments, when it is confirmed that the deformation state of the display does not satisfy the designated condition, the electronic device 101 (for example, the processor 120 in FIG. 1) may maintain output of the execution screen. For example, the processor 120 may output the execution screen through the first and second displays in the designated output scheme.

According to certain embodiments, when it is confirmed that the deformation state of the display satisfies the designated condition, the electronic device 101 (for example, the processor 120 in FIG. 1) may change the output scheme regarding at least one of the first display or the second display in operation 1330. According to an embodiment, the processor 120 may process one of the first display or the second display so as to operate as a display device supporting a first output scheme (for example, 2D output scheme) 1410 and may process the other display so as to operate as a display device supporting a second output scheme (for example, 3D output scheme) 1420, as illustrated in FIG. 14. According to another embodiment, the processor 120 may process one of the first display or the second display so as to operate as a display device and may process the other display so as to operate as an input device.

Expandable Display

Certain embodiments can also be applied to electronic devices with expandable display. FIG. 15 is a flowchart 1500 for determining the operating mode in connection with an electronic device according to certain embodiments. FIG. 16A is a diagram for describing the display structure of an electronic device according to certain embodiments, and FIG. 16B is a diagram for describing the display structure of an electronic device according to certain embodiments. FIG. 16C is another diagram for describing an operation of changing the output scheme based on the deformation state in according to embodiments. Various operations in the following embodiment may be performed successively, but are not necessary performed successively. For example, the order of respective operations may be changed, and at least two operations may be performed in a parallel manner.

Referring to FIG. 15, according to certain embodiments, the electronic device 101 (for example, the processor 120 in FIG. 1) may acquire first data by using at least one first sensor in operation 1510. According to an embodiment, the at least one first sensor may be some of sensors provided in the electronic device 101. The first sensor may be a sensor capable of sensing folding with regard to at least a part of the display. For example, the first sensor may include at least one of a Hall IC sensor, an angle encoder, a proximity sensor, or an acceleration sensor. However, this is only an example, and embodiments are not limited thereto. For example, the first sensor may include various kinds of sensors capable of sensing folding with regard to the display. According to an embodiment, as illustrated at 1600 in FIG. 16A, the display 1610 of the electronic device may be expanded (or reduced). In addition, at least one first sensor may be disposed on the second surface (for example, rear surface 1630) different from the first surface (for example, front surface 1620) of the display 1610, as illustrated in FIG. 16B. For example, as illustrated at 1630 in FIG. 16B, which illustrates a side surface of the display 1610, the display 1610 may be disposed on multiple housings 1632. In addition, respective housings 1632 may be disposed on both sides of the folding portion (for example, hinge member) 1638, and may be foldably or rotatably connected to each other by the folding portion 1638, as illustrated at 1640 in FIG. 16B. In addition, respective housings 1632 may be disposed on support members 1634, and at least one first sensor 1639 may be disposed on at least a part of each support member 1634-1 and 1634-2.

According to certain embodiments, the electronic device 101 (for example, the processor 120 in FIG. 1) may confirm whether or not the folding state of the display 1610 is sensed, based on at least a part of the first data, in operation 1520. The folding state may be related to a state in which, as illustrated at 1650 in FIG. 16C, at least one of multiple support members connected to each other around folding portions P1 and P2 (for example, folding portion 1638 in FIG. 16B) is rotated.

According to certain embodiments, when the folding state of the display 1610 is not sensed, the electronic device 101

(for example, the processor 120 in FIG. 1) may perform an operation of acquiring first data. The first data may include information regarding the angle between the support member 1634-1 and the support member 1634-2.

According to certain embodiments, when the folding state of the display 1610 is sensed, the electronic device 101 (for example, the processor 120 in FIG. 1) may process at least one second sensor so as to operate in operation 1530. According to an embodiment, the at least one second sensor may be different from the first sensor activated to acquire first data. For example, the at least one second sensor may be a sensor capable of sensing at least one of the degree of folding of the display 1610 or the strength of folding thereof. For example, the processor 120 may use the stretch sensor as the at least one second sensor. However, this is only an example, and embodiments are not limited thereto. For example, the processor 120 may use various kinds of sensors capable of sensing the degree of folding of the display 1610 or the strength of folding thereof, as the at least one second sensor.

According to certain embodiments, the electronic device 101 (for example, the processor 120 in FIG. 1) may confirm whether or not second data is acquired by the at least one second sensor in operation 1540.

According to certain embodiments, when acquisition of second data is not sensed, the electronic device 101 (for example, the processor 120 in FIG. 1) may determine the screen output scheme based on the first data in operation 1560. For example, the processor 120 may process an execution screen to be output so as to correspond to the expanded (or reduced) display 1610.

According to certain embodiments, when acquisition of second data is sensed, the electronic device 101 (for example, the processor 120 in FIG. 1) may determine the screen output scheme based on the first data and the second data in operation 1550. According to an embodiment, the processor 120 may measure deformation of the electronic device (or display) based on the second data. This may solve the problem in that, if the deformation state of the electronic device (or display) is measured solely by at least one first sensor, the deformation state of the electronic device cannot be measure precisely due to the characteristics of the first sensor. For example, the processor 120 may measure the angle of respective support members 1634-1 and 1634-2, but cannot precisely measure the deformation state of the electronic device solely based on the angle of the support members 1634-1 and 1634-2. As such, when a predetermined level of angle change is sensed with regard to the support members 1634-1 and 1634-2, the processor 120 may accurately measure the deformation state (for example, bending or rolling) of the electronic device by using the stretch sensor. As another example, the processor 120 may measure folding with regard to respective support members 1634-1 and 1634-2, but cannot precisely measure the deformation state of the electronic device due to accumulated errors regarding folding of the support members 1634-1 and 1634-2. As such, when a predetermined level of folding is sensed with regard to the designated support members 1634-1 and 1634-2, the processor 120 may accurately measure the deformation state of the electronic device by using the stretch sensor. In addition, the processor 120 may determine the screen output scheme based on the measured deformation of the electronic device. For example, the processor 120 may distinguish between a first region 1652 and a second region 1654 with reference to a region in which a designated degree of folding or designated strength of folding is sensed. In addition, the processor 120 may apply different output schemes to the distinguished first region 1652 and second region 1654. For example, the processor 120 may use one of the first region 1652 and the second region 1654 as a fixed region, and may use the other region as an expanded region. For example, the processor 120 may adjust the ratio regarding the execution screen output in the expanded region based on the second data, and may fix the ratio regarding the execution screen output in the fixed region. As another example, the processor 120 may process one of the first region 1652 or the second region 1654 so as to operate as a display device, and may process the other region so as to operate as an input device. As another example, the processor 120 may process one of the first region 1652 or the second region 1654 so as to operate as a display device supporting a first output scheme, and may process the other region so as to operate as a display device supporting a second output scheme.

A method for operating an electronic device (for example, the electronic device 101 in FIG. 1) according to certain embodiments may include the operations of: acquiring first data by using at least one first sensor (for example, at least a part of the physical sensor 510 in FIG. 5) configured to measure a relative position and/or angle of a first portion (for example, the first housing 212 in FIG. 2A) and a second portion (for example, the second housing 214 in FIG. 2A) of a flexible display (for example, the main display 230 in FIG. 2A); activating a second sensor (for example, another part of the physical sensor 510 in FIG. 5) different from the first sensor at least partially based on the acquired first data; acquiring second data by using the activated second sensor; and sensing a deformation state of the flexible display at least partially based on the acquired first or second data.

According to an embodiment, the operation of acquiring first data may include an operation of monitoring an initial state of the flexible display by using the first sensor, after booting of the electronic device.

According to an embodiment, the at least one first sensor may include at least one of a Hall IC sensor (for example, the Hall IC sensor 517 in FIG. 5) or an acceleration sensor (for example, the acceleration sensor 511 in FIG. 5), which is disposed in the electronic device.

According to an embodiment, the at least one second sensor may include at least one of an angle encoder (for example, the angle encoder 513 in FIG. 5) or a rotary sensor (for example, the rotary sensor 519 in FIG. 5), which is disposed in the electronic device.

According to an embodiment, the operation of activating a second sensor may include an operation of activating the at least one second sensor at least partially based on the first data and accuracy information and/or current consumption information of the first sensor and the at least one second sensor corresponding to the relative position and/or angle.

According to an embodiment, the operation of activating a second sensor may include an operation of activating the at least one second sensor at least partially based on the first data and information regarding the first sensor and the at least one second sensor corresponding to at least one application.

According to an embodiment, the operation of activating a second sensor may include the operations of: measuring an angle regarding a third portion of the flexible display; determining the folding type of the flexible display based on angles of the first portion, the second portion, and the third portion; and activating the at least one second sensor based on the determined folding type.

According to an embodiment, the method may include an operation of activating the at least one second sensor and then deactivating the at least one first sensor.

According to an embodiment, the operation of sensing a deformation state of the flexible display may include the operations of: activating at least one third sensor different from the first sensor and the at least one second sensor when the sensed deformation state of the flexible display satisfies a designated condition; acquiring third data by using the activated third sensor (for example, another part of the physical sensor 510 in FIG. 5); and monitoring the deformation state of the flexible display based on the acquired third data.

According to an embodiment, the method may include an operation of determining an output scheme regarding the first portion and the second portion based on the sensed deformation state of the flexible display.

Meanwhile, although certain embodiments have been described, various modifications can be made without deviating from the scope of certain embodiments. Accordingly, the scope of certain embodiments is not to be limited to the described embodiments, but is to be defined by the accompanying claims and equivalents thereof

What is claimed is:

1. An electronic device comprising:
a housing;
a flexible display comprising a first portion and a second portion that are movable relative to each other;
at least one first sensor disposed in the housing and configured to measure a relative position of the first portion and the second portion;
at least one second sensor different from the at least one first sensor, the at least one second sensor being disposed in the housing and configured to measure the relative position of the first portion and the second portion;
at least one processor disposed in the housing and operatively connected to the flexible display, the at least one first sensor, and the at least one second sensor; and
memory operatively connected to the at least one processor, wherein
the memory stores instructions that, when executed, cause the at least one processor to perform a plurality of operations comprising:
acquiring first data from the at least one first sensor;
activating the at least one second sensor at least partially based on the acquired first data;
acquiring second data from the at least one second sensor; and
sensing a deformation state of the flexible display at least partially based on the acquired first or second data.

2. The electronic device of claim 1, wherein the plurality of operations further comprise monitoring an initial state of the housing from the at least one first sensor, after booting of the electronic device.

3. The electronic device of claim 1, wherein the at least one first sensor comprises at least one of a Hall IC sensor and an acceleration sensor.

4. The electronic device of claim 1, wherein the at least one second sensor comprises at least one of an angle encoder and a rotary sensor.

5. The electronic device of claim 1, wherein the memory is configured to store accuracy information or current consumption information of the at least one first sensor and the at least one second sensor corresponding to the relative position, and the plurality of operations further comprise activating the at least one second sensor at least partially based on the first data and the information.

6. The electronic device of claim 1, wherein the memory is configured to store information regarding the at least one first sensor and the at least one second sensor corresponding to at least one application, and the plurality of operations further comprise activating the at least one second sensor at least partially based on the first data and the information.

7. The electronic device of claim 1, wherein the flexible display further comprises third portions that are moveable relative to each other;
the memory is configured to store information regarding the at least one first sensor and the at least one second sensor corresponding to a folding type of the flexible display, wherein the folding type of the flexible display is determined based on based on angles of the first portion, the second portion, and the third portion; and
the plurality of operations further comprise determining the folding type of the flexible display at least partially based on the first data and to activate the at least one second sensor based on the information corresponding to the determined folding type.

8. The electronic device of claim 1, wherein the plurality of operations further comprise activating the at least one second sensor and then deactivating the at least one first sensor.

9. The electronic device of claim 1, further comprising at least one third sensor different from the at least one first sensor and the at least one second sensor, the third sensor disposed in the housing and configured to measure the relative position of the first portion and the second portion,
wherein the plurality of operations further comprise:
activating the at least one third sensor when the deformation state of the flexible display satisfies a designated condition;
acquiring third data by using the activated at least one third sensor; and
monitoring the deformation state of the flexible display based on the acquired third data, and
wherein the at least one third sensor comprises a gyro sensor.

10. The electronic device of claim 1, wherein the plurality of operations further comprise determining an output scheme regarding the first portion and the second portion based on the deformation state of the flexible display.

11. A method for operating an electronic device, the method comprising:
acquiring first data from at least one first sensor configured to measure a relative position of a first portion and a second portion of a flexible display;
activating at least one second sensor different from the at least one first sensor at least partially based on the acquired first data;
acquiring second data from the activated at least one second sensor; and
sensing a deformation state of the flexible display at least partially based on the acquired first or second data.

12. The method of claim 11, wherein the acquiring first data may comprise monitoring an initial state of the flexible display from the at least one first sensor, after booting of the electronic device.

13. The method of claim 11, wherein the at least one first sensor comprises at least one of a Hall IC sensor or an acceleration sensor, which is disposed in the electronic device.

14. The method of claim 11, wherein the at least one second sensor comprises at least one of an angle encoder or a rotary sensor, which is disposed in the electronic device.

15. The method of claim 11, wherein the activating the at least one second sensor comprises activating the at least one second sensor at least partially based on the first data and accuracy information or current consumption information of the at least one first sensor and the at least one second sensor corresponding to the relative position.

16. The method of claim 11, wherein activating the at least one second sensor comprises activating the at least one second sensor at least partially based on the first data and information regarding the at least one first sensor and the at least one second sensor corresponding to at least one application.

17. The method of claim 11, wherein activating the at least one second sensor comprises:
determining a folding type of the flexible display based on angles of the first portion, the second portion, and a third portion of the flexible display; and
activating the at least one second sensor based on the determined folding type.

18. The method of claim 11, comprising activating the at least one second sensor and deactivating the at least one first sensor after activating the at least one second sensor.

19. The method of claim 11, wherein the sensing the deformation state of the flexible display comprises:
activating at least one third sensor different from the at least one first sensor and the at least one second sensor when the deformation state of the flexible display satisfies a designated condition;
acquiring third data from the activated third sensor; and
monitoring the deformation state of the flexible display based on the acquired third data.

20. The method of claim 11, comprising determining an output scheme regarding the first portion and the second portion based on the deformation state of the flexible display.

* * * * *